United States Patent [19]

Bahl et al.

[11] Patent Number: 4,977,599
[45] Date of Patent: Dec. 11, 1990

[54] SPEECH RECOGNITION EMPLOYING A SET OF MARKOV MODELS THAT INCLUDES MARKOV MODELS REPRESENTING TRANSITIONS TO AND FROM SILENCE

[75] Inventors: Lalit R. Bahl, Amawalk; Peter V. DeSouza; Robert L. Mercer, both of Yorktown Heights; Michael A. Picheny, White Plains, all of N.Y.

[73] Assignee: International Business Machines Corporation, Armonk, N.Y.

[21] Appl. No.: 289,447

[22] Filed: Dec. 15, 1988

Related U.S. Application Data

[63] Continuation of Ser. No. 738,912, May 29, 1985, abandoned.

[51] Int. Cl.$^5$ .............................................. G10L 5/04
[52] U.S. Cl. ........................................ 381/43; 381/41
[58] Field of Search .................................. 381/41–50; 364/513, 513.5

[56] References Cited

U.S. PATENT DOCUMENTS

| | | | |
|---|---|---|---|
| 3,588,356 | 6/1971 | Moshier et al. | 381/43 |
| 3,946,157 | 3/1976 | Dreyfus | 381/43 |
| 4,156,868 | 5/1979 | Levinson | 381/43 |
| 4,370,521 | 1/1983 | Johnston et al. | 381/41 |
| 4,481,593 | 11/1984 | Bahler | 381/43 |
| 4,587,670 | 5/1986 | Levinson et al. | 381/43 |

OTHER PUBLICATIONS

Frederick Jelinek, "Continuous Speech Recognition by Statistical Methods", Proceedings of the IEEE, vol. 64, No. 4, Apr. 1976.
H. Bourlard et al, "Speaker Dependent Connected Speech Recognition via Phonemic Markov Models", ICASSP 85 Proceedings, Mar. 1985.
R. Bakis, "Spoken Word Spotting Via Centisecond Acoustic States", IBM Technical Disclosure Bulletin, vol. 18, No. 10, Mar. 1976.
L. R. Bahl et al, "A Maximum Likelihood approach to Continuous Speech Recognition", IEEE Transactions on Pattern Analysis and Machine Intelligence, vol. PAMI-5, No. 2, pp. 179–190, Mar. 1983.
L. R. Bahl et al, "Speech Recognition of a Natural Text Read as Isolated Word", IEEE International Conference on Acoustics, Speech and Signal Processing, Atlanta, Ga., U.S., vol. 3, pp. 1168–1171, Apr. 1981.
L. R. Bahl, F. Jelinek, R. L. Mercer–"Faster Acoustic Match Computation", Sep. 1980, pp. 1718–1719.
L. R. Bahl, F. Jelinek, R. L. Mercer–"A Maximum Likelihood Approach To Continuous Speech Recognition", Mar., 1983, pp. 179–190.

Primary Examiner—Gary V. Harkcom
Assistant Examiner—David O. Knepper
Attorney, Agent, or Firm—Marc D. Schechter

[57] ABSTRACT

Apparatus and method for constructing word baseforms which can be matched against a string of generated acoustic labels. A set of phonetic phone machines are formed, wherein each phone machine has (i) a plurality of states, (ii) a plurality of transitions each of which extends from a state to a state, (iii) a stored probability for each transition, and (iv) stored label output probabilities, each label output probability corresponding to the probability of each phone machine producing a corresponding label. The set of phonetic machines is formed to include a subset of onset phone machines. The stored probabilities of each onset phone macine correspond to at least one phonetic element being uttered at the beginning of a speech segment. The set of phonetic machines is formed to include a subset of trailing phone machines. The stored probabilities of each trailing phone machine correspond to at least one single phonetic element being uttered at the end of a speech segment. Word baseforms are constructed by concatenating phone machines selected from the set.

19 Claims, 26 Drawing Sheets

DETAILED MATCH LATTICE

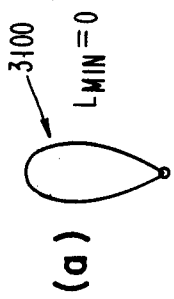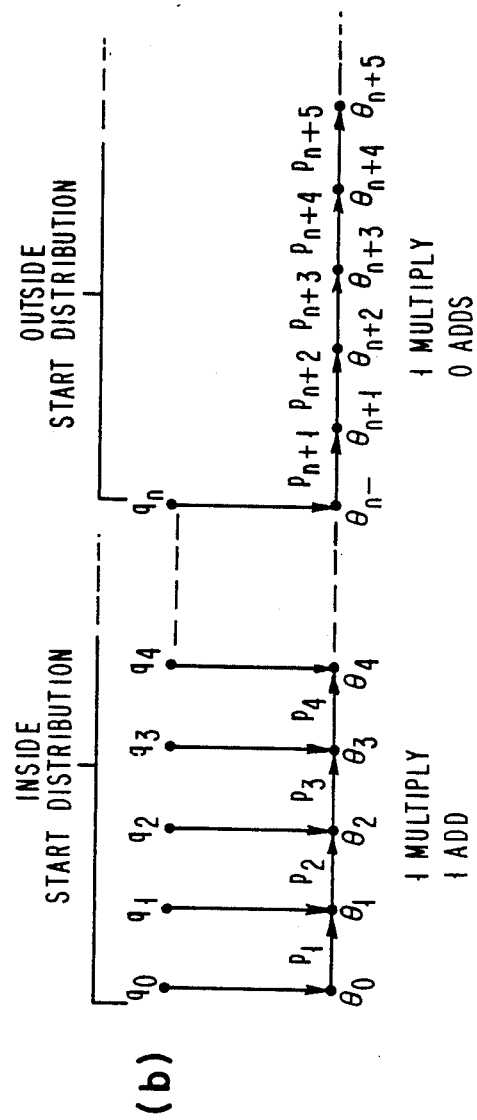
FIG. 18

0.1 SEC.

BUILDUP
OF $\omega$

DECAY
OF $\ell$

FIG. 26   ONLX — WX — IX1 — LX — TRLX
BASEFORM OF THE WORD "WILL"

FIG. 27   WIL
PHONETIC SPELLING OF THE WORD "WILL"

FIG. 28   ONBX — BX — AW1 — GX — TRBX
BASEFORM OF THE WORD "BOG"

FIG. 29   ONBX — DX — AW1 — GX — TRBX
BASEFORM OF THE WORD "DOG"

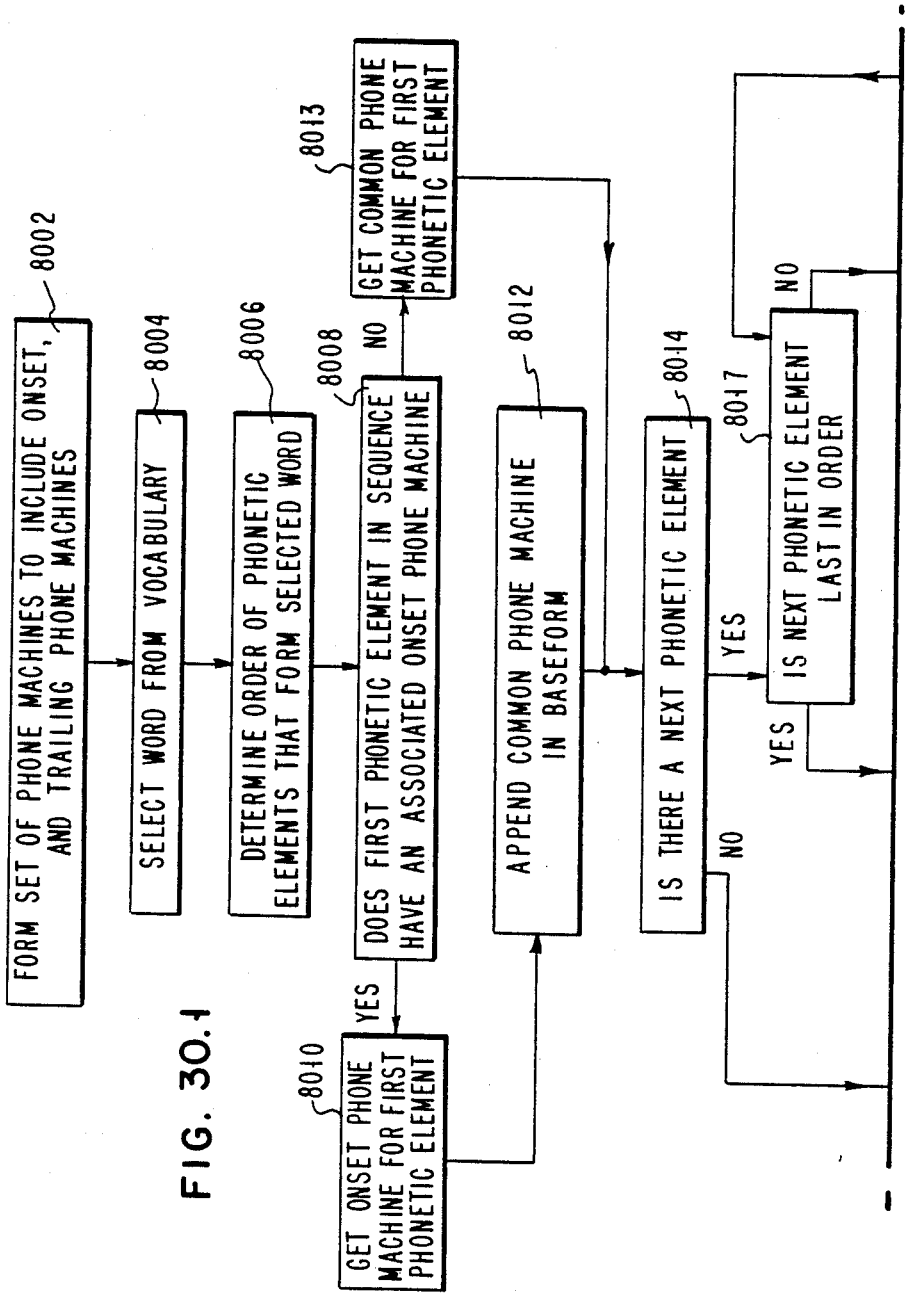
FIG. 30.1

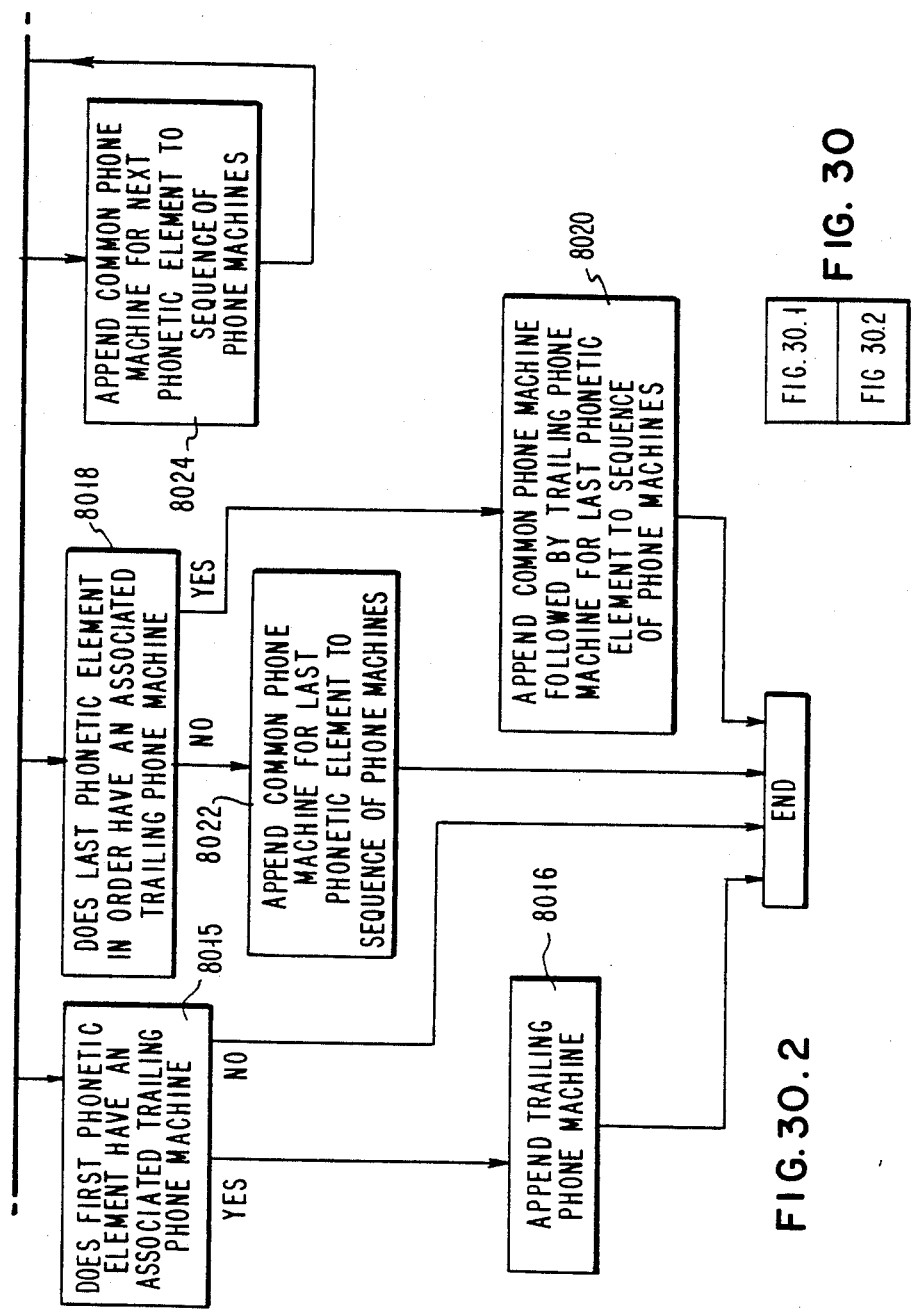

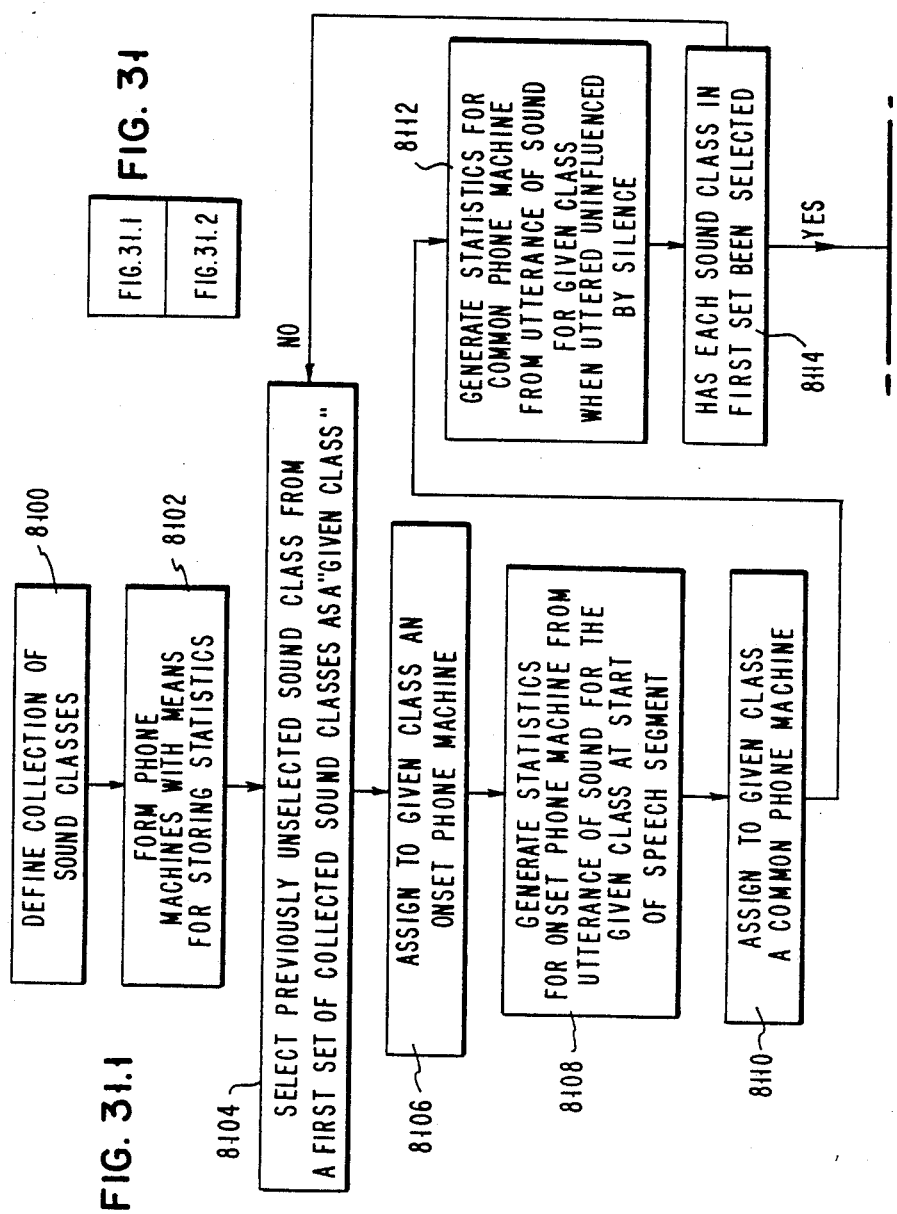

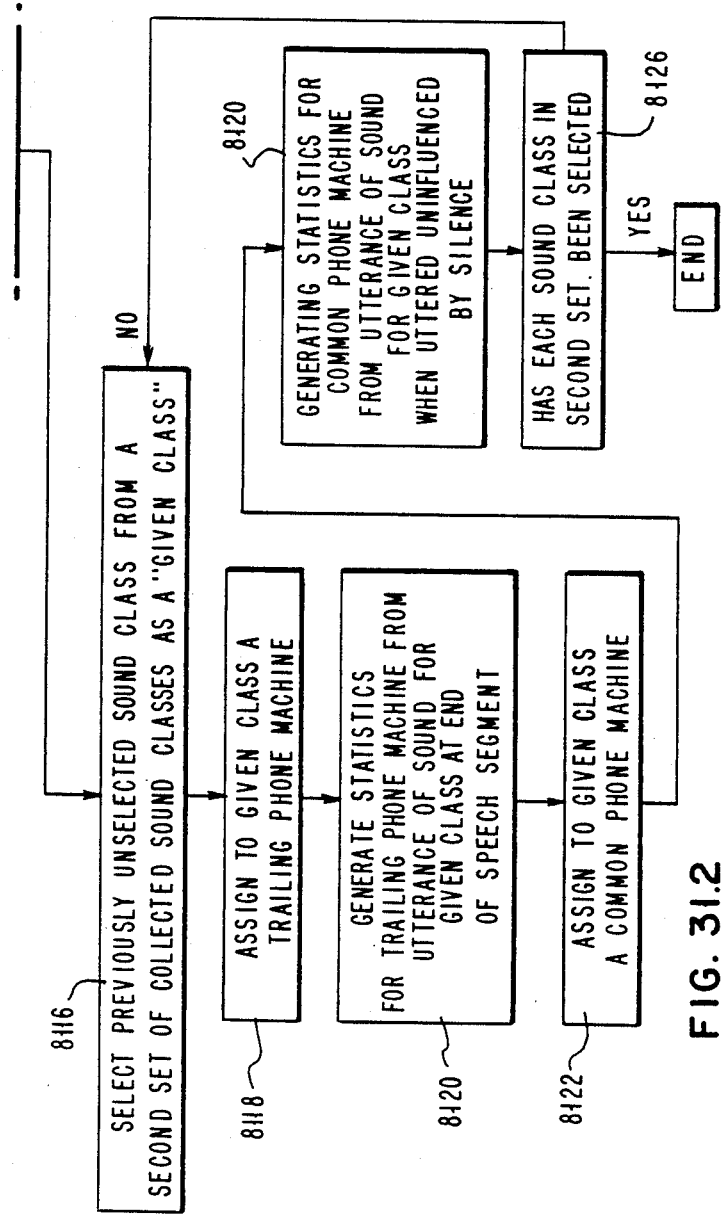
FIG. 31.2

SPEECH RECOGNITION EMPLOYING A SET OF MARKOV MODELS THAT INCLUDES MARKOV MODELS REPRESENTING TRANSITIONS TO AND FROM SILENCE

This is a continuation of application Ser. No. 738,912, filed May 29, 1985, now abandoned.

FIELD OF THE INVENTION

The present invention relates to the field of generating acoustic models which may be used in characterizing words.

DESCRIPTION OF PRIOR AND CONTEMPORANEOUS ART

The following cases relate to inventions which provide background or environment for the present invention: "Nonlinear Signal Processing in a Speech Recognition System", Ser. No. 06/665401 filed Oct. 26, 1984; and "Apparatus and Method for Performing Acoustic Matching", Ser. No. 06/672974 filed Nov. 19, 1984, now abandoned.

In a probabilistic approach to speech recognition, an acoustic waveform is initially transformed into a string of labels by an acoustic processor. The labels, each of which identifies a sound type, are selected from an alphabet of typically approximately 200 different labels. The generating of such labels has been discussed in various articles and in the patent application entitled "Nonlinear Signal Processing in a Speech Recognition System". Briefly, the acoustic input is divided into successive frames of time and, for each frame of time, a label is assigned. The labels are normally defined based on energy characteristics.

In employing the labels to achieve speech recognition, Markov model (or probabilistic finite-state) machines have been previously suggested. A Markov model normally includes a plurality of states and transitions between the states. In addition, the Markov model normally has probabilities assigned thereto relating to (a) the probability of each transition occurring and (b) the respective probability of producing each label at various transitions. The Markov model (or, equivalently, Markov source) has been described in various articles such as "A Maximum Likelihood Approach to Continuous Speech Recognition", *IEEE Transactions on Pattern Analysis and Machine Intelligence*, volume PAMI-5, Number 2, March 1983, by L. R. Bahl, F. Jelinek, and R. L. Mercer. Markov model machines are also referred to as Markov model "phone machines" or, simply, "phone machines."

In recognizing speech, a matching process is performed to determine which word (or words) in the vocabulary has the highest likelihood of having produced the string of labels generated by the acoustic processor. One such matching procedure is set forth in the co-pending application entitled "Apparatus and Method for Performing Acoustic Matching". As set forth therein, acoustic matching is performed by (a) characterizing each word in a vocabulary by a sequence of Markov model phone machines and (b) determining the respective likelihood of each word-representing sequence of phone machines producing the string of labels generated by the acoustic processor. Each word-representing sequence of phone machines corresponds to a word baseform.

In defining the word baseforms, it is first necessary to define the nature of the phone machines used in constructing the baseforms. In the application entitled "Apparatus and Method for Performing Acoustic Matching", a word baseform constructed of phonetic phone machines is discussed. In that instance, each phone machine corresponds to a phonetic sound and includes seven states and thirteen transitions. Specifically, a set of approximately seventy phones, each representing a corresponding phonetic element, have been relied on to construct baseforms. Typically, the baseform for a word has been constructed by a phonetician breaking a word into respective phonetic segments and assigning a corresponding phone machine to each phonetic segment.

Until the present invention, each of the seventy phones represented a given sound class regardless of whether the sound corresponding to the given class occurred at the beginning, middle, or end of a word. For example, the "k" sound would be represented by a phone k whether occurring in the beginning of a word as in "cat"; in the middle of a word as in "scat"; or at the end of the word as in "back".

SUMMARY OF THE INVENTION

The present invention recognizes the fact that certain sounds feature different energy characteristics depending on whether the sound is adjacent to—i.e., precedes or follows—a period of silence. In particular, the invention accounts for the fact that when preceded by a period of silence, some sounds experience an energy build-up and that some sounds experience an energy decay when followed by a period of silence. Since energy characteristics are generally used by the acoustic processor in determining the labels to be generated for an acoustic input, different labels are likely to be generated—due to energy build-up or decay—depending on whether a sound occurs at the beginning or end of a word.

Accordingly, the present invention defines some phone machines which account for energy build-up when a sound is uttered at the start of a word and other phone machines which account for energy decay when a sound is uttered at the end of a word. Still a third type of phone machine corresponds to a sound being uttered where there are no significant effects of energy build-up or decay. The first type of phone machine is referred to as an "onset" phone machine. The second type of phone machine is referred to as a "trailing" phone machine. The third type of phone machine is referred to as a "common" phone machine.

The statistics of the onset phone machine reflect the transition from silence and the statistics of the trailing phone machine reflect the transition to silence.

Preferably, the common phone machine has statistics which correspond to the sound being uttered in the middle of a word or, more generally, to the sound being uttered at a word position at which transition to or from silence does not greatly affect phone machine statistics.

A given sound class may have associated therewith only a common phone machine if the energy characteristics of the corresponding sound do not vary significantly regardless of where in a word the sound is uttered.

In accordance with the present invention, then, a plurality of onset phone machines and trailing phone machines are provided to account for the energy characteristics of certain sounds when they occur adjacent to periods of silence.

It is thus contemplated by the invention that, when a given word starts with a subject sound class having an onset phone machine corresponding thereto, the word has a baseform which starts with the onset phone machine and is followed by the common phone machine for the subject sound class. Similarly, it is contemplated by the invention that, when a given word ends with a subject sound class having a trailing phone machine corresponding thereto, the word has a baseform which ends with the trailing phone machine and is preceded by the common phone machine for the subject sound class.

It is thus an object of the invention to include in a set of Markov models—from which word baseforms are constructed—Markov models corresponding to sounds occurring at transitions to or from silence, in order to enhance accuracy in a word recognition system employing such baseforms.

It is yet another object of one embodiment of the invention to limit the number of total phone machines by grouping together sound classes which have similar energy build-up characteristics and defining a single onset phone machine for all sound classes in the group. Similarly, a single trailing phone machine is preferably associated with all sound classes in a group of sound classes having similar decay characteristics.

The method which achieves the above objects comprises the steps of: forming a set of phonetic phone machines, wherein each phone machine has (i) a plurality of states, (ii) a plurality of transitions each of which extends from a state to a state, (iii) a stored probability for each transition, and (iv) stored label output probabilities, each label output probability corresponding to the probability of said each phone machine producing a corresponding label; wherein said set of phonetic machines is formed to include a subset of onset phone machines, the stored probabilities of each onset phone machine corresponding to at least one phonetic element being uttered at the beginning of a speech segment; and constructing each word baseform as a sequence of phone machines wherein a word, starting with a phonetic element having a given onset phone machine corresponding thereto, has a word baseform which starts with the given onset phone machine.

The method is further characterized in that said set of phonetic machines is formed to include a subset of trailing phone machines, the stored probabilities of each trailing phone machine corresponding to at least one single phonetic element being uttered at the end of a speech segment; and each word baseform being constructed as a sequence of phone machines wherein a word, ending with a phonetic element having a given trailing phone machine corresponding thereto, has a word baseform which ends with the given trailing phone machine.

Apparatus for achieving the above objects comprises: a set of Markov model phone machines, each phone machine being characterized as having (i) a plurality of states, (ii) a plurality of transitions each of which extends from a state to a state, (iii) means for storing a probability for each transition, and (iv) means for storing label output probabilities, each label output probability corresponding to the probability of said each phone machine producing a particular label at an identified transition; wherein some of the phone machines comprise onset phone machines, each onset phone machine (i) being associated with at least one sound class from a set of sound classes and (ii) having transition probabilities and label output probabilities trained from at least one utterance of an associated sound class at the onset of a word; and means for constructing each word baseform as a sequence of phone machines, said constructing means including means for positioning a given onset phone machine at the beginning of a subject word baseform when the word corresponding to the subject word baseform starts with a sound class associated with the given onset phone machine.

The apparatus is further characterized in that some of the phone machines comprise trailing phone machines, each trailing phone machine (i) being associated with at least one sound class from a set of sound classes and (ii) having transition probabilities and label output probabilities trained from at least one utterance of an associated sound class at the end of a speech segment; said constructing means further including means for positioning a given trailing phone machine at the end of a subject word baseform when the word corresponding to the subject word baseform ends with a sound class associated with the given trailing phone machine.

Moreover, the apparatus further comprises common phone machines each of which corresponds to a sound class which is affected by energy build-up when at the start of an utterance, each common phone machine representing the sound class when unaffected by energy build-up; and wherein said constructing means further includes means for including an onset phone machine followed by a common phone machine corresponding to a particular sound class when the particular sound class starts the word and has an onset phone machine associated therewith.

BRIEF DESCRIPTION OF THE DRAWINGS

FIG. 18 (a) is a diagram showing a particular phone machine of minimum length zero and FIG. 18 (b) is a time diagram corresponding thereto.

FIG. 26 is a drawing showing the word "WILL" as a baseform according to the invention, the baseform including five successive phones.

FIG. 27 is a drawing representing the standard phonetic spelling of the word "WILL" as three successive phonetic elements.

FIG. 28 is an illustration showing the sequence of phones for the word "BOG" according to the invention.

FIG. 29 is an illustration showing the sequence of phones for the word "DOG" according to the invention.

FIGS. 30, 30.1 and 30.2 represent a flowchart showing how a baseform is constructed according to the invention.

FIGS. 31, 31.1 and 31.2 represent a flowchart showing how onset phone machines, common phone machines, and trailing phone machines are formed in accordance with the invention for use in constructing enhanced baseforms.

DESCRIPTION OF A PREFERRED EMBODIMENT OF THE INVENTION (I) Speech Recognition System Environment A. General Description In FIG. 1, a general block diagram of a speech recognition system 1000 is illustrated. The system 1000 includes a stack decoder 1002 to which are connected an acoustic processor (AP) 1004, an array processor 1006 used in performing a fast approximate acoustic match, an array processor 1008 used in performing a detailed acoustic match, a language model 1010, and a work station 1012.

The acoustic processor 1004 is designed to transform a speech waveform input into a string of labels, or fenemes, each of which in a general sense identifies a corresponding sound type. In the present system, the acoustic processor 1004 is based on a unique model of the human ear, and is described in the above-mentioned application entitled "Nonlinear Signal Processing in a Speech Recognition System".

Figure 2:
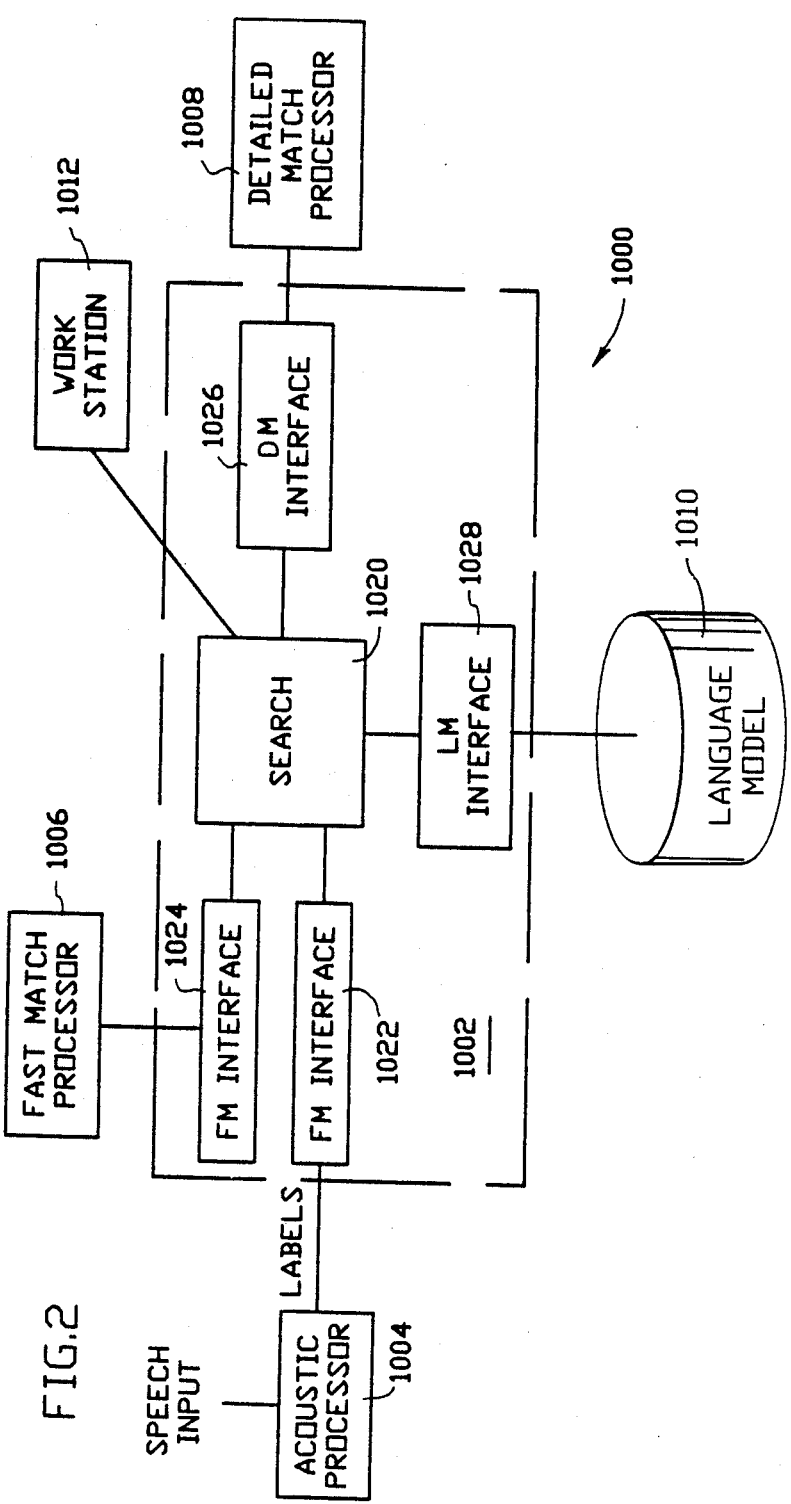
FIG. 2 is a block diagram of the system environment of FIG. 1 wherein the stack decoder is shown in greater detail.

The labels, or fenemes, from the acoustic processor 1004 enter the stack decoder 1002. In a logical sense, the stack decoder 1002 may be represented by the elements shown in FIG. 2. That is, the stack decoder 1002 includes a search element 1020 which communicates with the work station 1012 and which communicates with the acoustic processor process, the fast match processor process, the detailed match process, and the language model process through respective interfaces 1022, 1024, 1026, and 1028.

In operation, fenemes from the acoustic processor 1004 are directed by the search element 1020 to the fast match processor 1006. The fast match procedure is described hereinbelow as well as in the application entitled "Apparatus and Method for Performing Acoustic Matching". Briefly, the object of matching is to determine the most likely word (or words) for a given string of labels.

The fast match is designed to examine words in a vocabulary of words and to reduce the number of candidate words for a given string of incoming labels. The fast match is based on probabilistic finite state machines, also referred to herein as Markov models.

Once the fast match reduces the number of candidate words, the stack decoder 1002 communicates with the language model 1010 which determines the contextual likelihood of each candidate word in the fast match candidate list based preferably on existing tri-grams.

Preferably, the detailed match examines those words from the fast match candidate list which have a reasonable likelihood of being the spoken word based on the language model computations. The detailed match is discussed in the above-mentioned application entitled "Apparatus and Method for Performing Acoustic Matching".

Figure 3:
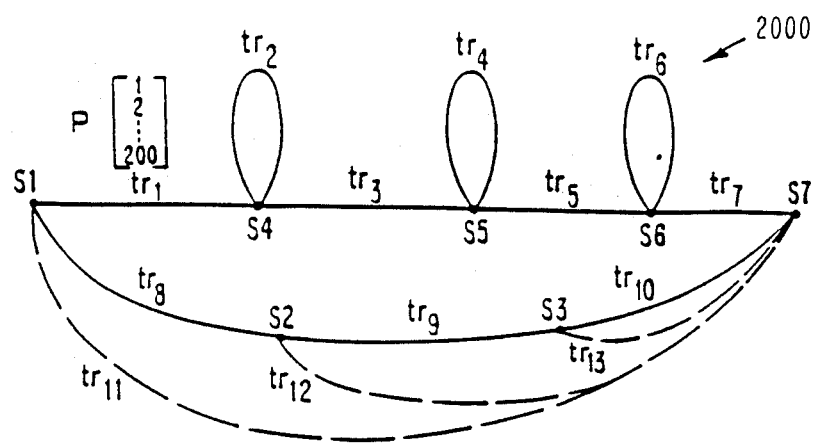
FIG. 3 is an illustration of a detailed match phone machine which is identified in storage and represented therein by statistics obtained during a training session.

The detailed match is performed by means of Markov model phone machines such as the machine illustrated in FIG. 3.

After the detailed match, the language model is, preferably, again invoked to determine word likelihood. The stack decoder 1002 of the present invention—using information derived from the fast matching, detailed matching, and applying the language model—is designed to determine the most likely path, or sequence, of words for a string of generated labels.

Two prior art approaches for finding the most likely word sequence are Viterbi decoding and single stack decoding. Each of these techniques are described in an article by Bahl, Jelinek, and Mercer article, "A Maximum Likelihood Approach to Continuous Speech Recognition," *IEEE Transactions on Pattern Analysis and Machine Intelligence*, Volume PAMI-5, Number 2, pp. 179–190 (1983). Viterbi decoding is described in section V and single stack decoding in section VI of the article.

In the single stack decoding technique, paths of varying length are listed in a single stack according to likelihood and decoding is based on the single stack. Single stack decoding must account for the fact that likelihood is somewhat dependent on path length and, hence, normalization is generally employed.

The Viterbi technique does not requiring normalization and is generally practical for small tasks.

As another alternative, decoding may be performed with a small vocabulary system by examining each possible combination of words as a possible word sequence and determining which combination has the highest probability of producing the generated label string. The computational requirements for this technique become impractical for large vocabulary systems.

The stack decoder 1002, in effect, serves to control the other elements but does not perform many computations. Hence, the stack decoder 1002 preferably includes a 4341 running under the IBM VM/370 operating system as described in publications such as *Virtual Machine/System Product Introduction Release* 3 (1983). The array processors which perform considerable computation have been implemented with Floating Point System (FPS) 190L's, which are commercially available.

A novel technique which includes multiple stacking and a unique decision strategy has been invented by L. R. Bahl, F. Jelinek, and R. L. Mercer. This technique is suggested in FIG. 4, FIG. 5, and FIG. 6.

Figure 5:
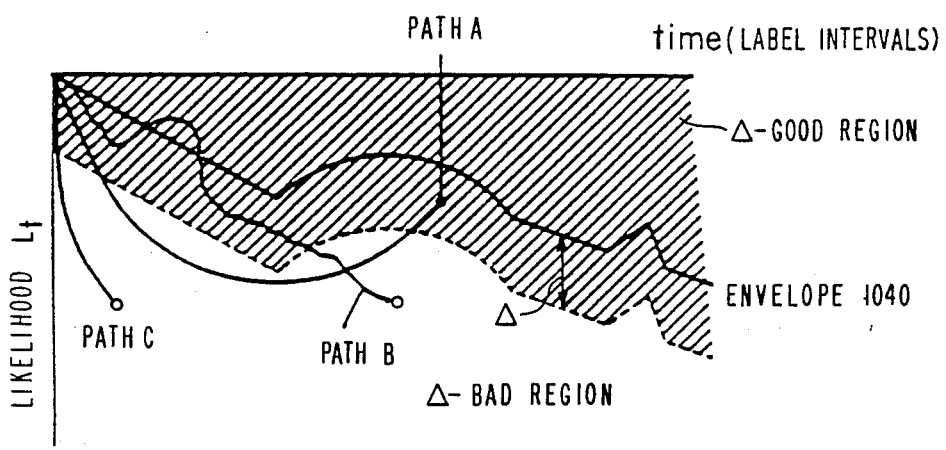
FIG. 5 is a graph depicting likelihood vectors for respective word paths and a likelihood envelope.
Figure 4:
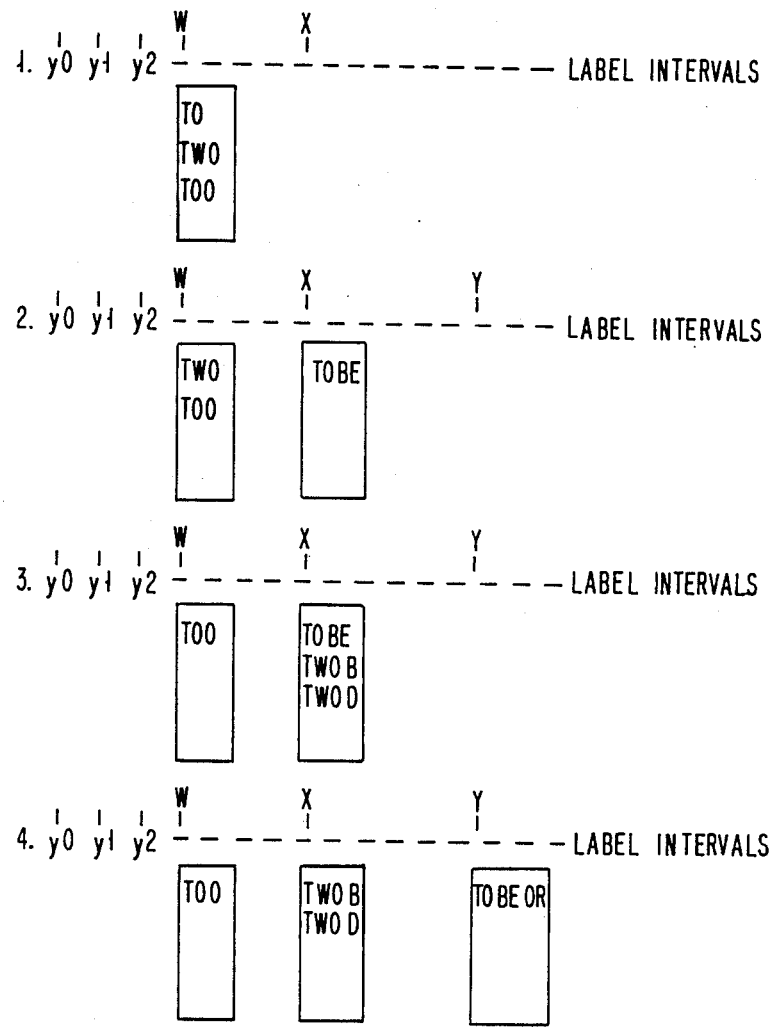
FIG. 4 is an illustration showing successive steps of stack decoding.

In FIG. 4 and FIG. 5, a plurality of successive labels yy₂—are shown generated at successive "label intervals".

Also shown in FIG. 5 are a plurality of word paths, namely path A, path B, and path C. In the context of FIG. 4, path A could correspond to the entry "to be or", path B to the entry "two b", and path C to the entry "too". For a subject word path, there is a label (or equivalently a label interval) at which the subject word path has the highest probability of having ended—such label being referred to as a "boundary label".

For a word path W representing a sequence of words, a most likely end time—represented in the label string as a "boundary label"—can be found by known methods such as that described in likely boundary between two words is set forth in an article entitled "Faster Acoustic Match Computation" (by L. R. Bahl, F. Jelinek, and R. L. Mercer) in the *IBM Technical Disclosure Bulletin* volume 23, number 4, September 1980. Briefly, the article discusses methodology for addressing two similar concerns: (a) how much of a label string Y is accounted for by a word (or word sequence) and (b) at which label interval does a partial sentence—corresponding to a part of the label string—end.

For any given word path, there is a "likelihood value" associated with each label or label interval, including the first label of the label string through to the boundary label. Taken together, all of the likelihood values for a given word path represent a "likelihood vector" for the given word path. Accordingly, for each word path there is a corresponding likelihood vector. Likelihood values $L_t$ are illustrated in FIG. 5.

A "likelihood envelope" $\Lambda_t$ at a label interval t for a collection of word paths $W^1, W^2, \ldots, W^s$ is defined mathematically as:

$$\Lambda_t = \max(L_t(W^1), —, L_t(W^s))$$

That is, for each label interval, the likelihood envelope includes the highest likelihood value associated with any word path in the collection. A likelihood envelope 1040 is illustrated in FIG. 5.

A word path is considered "complete" if it corresponds to a complete sentence. A complete path is preferably identified by a speaker entering an input, e.g. pressing a button, when he reaches the end of a sentence. The entered input is synchronized with a label interval to mark a sentence end. A complete word path cannot be extended by appending any words thereto. A "partial" word path corresponds to an incomplete sentence and can be extended.

Partial paths are classified as "live" or "dead". A word path is "dead" if it has already been extended and "live" if it has not. With this classification, a path which has already been extended to form one or more longer extended word paths is not reconsidered for extension at a subsequent time.

Each word path is also characterizable as "good" or "bad" relative to the likelihood envelope. The word path is good if, at the label corresponding to the boundary label thereof, the word path has a likelihood value which is within $\Delta$ of the maximum likelihood envelope. Otherwise the word path is marked as "bad". Preferably, but not necessarily, $\Delta$ is a fixed value by which each value of the maximum likelihood envelope is reduced to serve as a good/bad threshold level.

For each label interval there is a stack element. Each live word path is assigned to the stack element corresponding to the label interval that corresponds to the boundary label of such a live path. A stack element may have zero, one, or more word path entries—the entries being listed in order of likelihood value.

Figure 1:
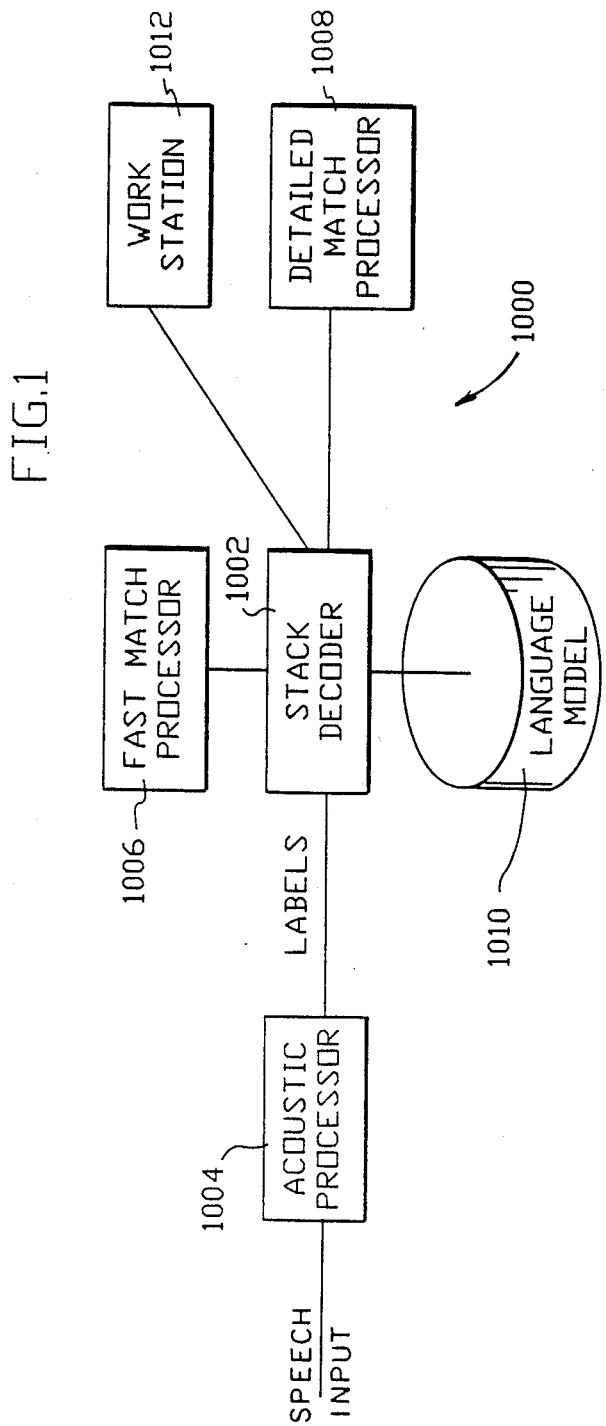
FIG. 1 is a general block diagram of a system environment in which the present invention may be practiced.

The steps performed by the stack decoder 1002 of FIG. 1 are discussed below with reference to FIG. 6.

Figure 6:
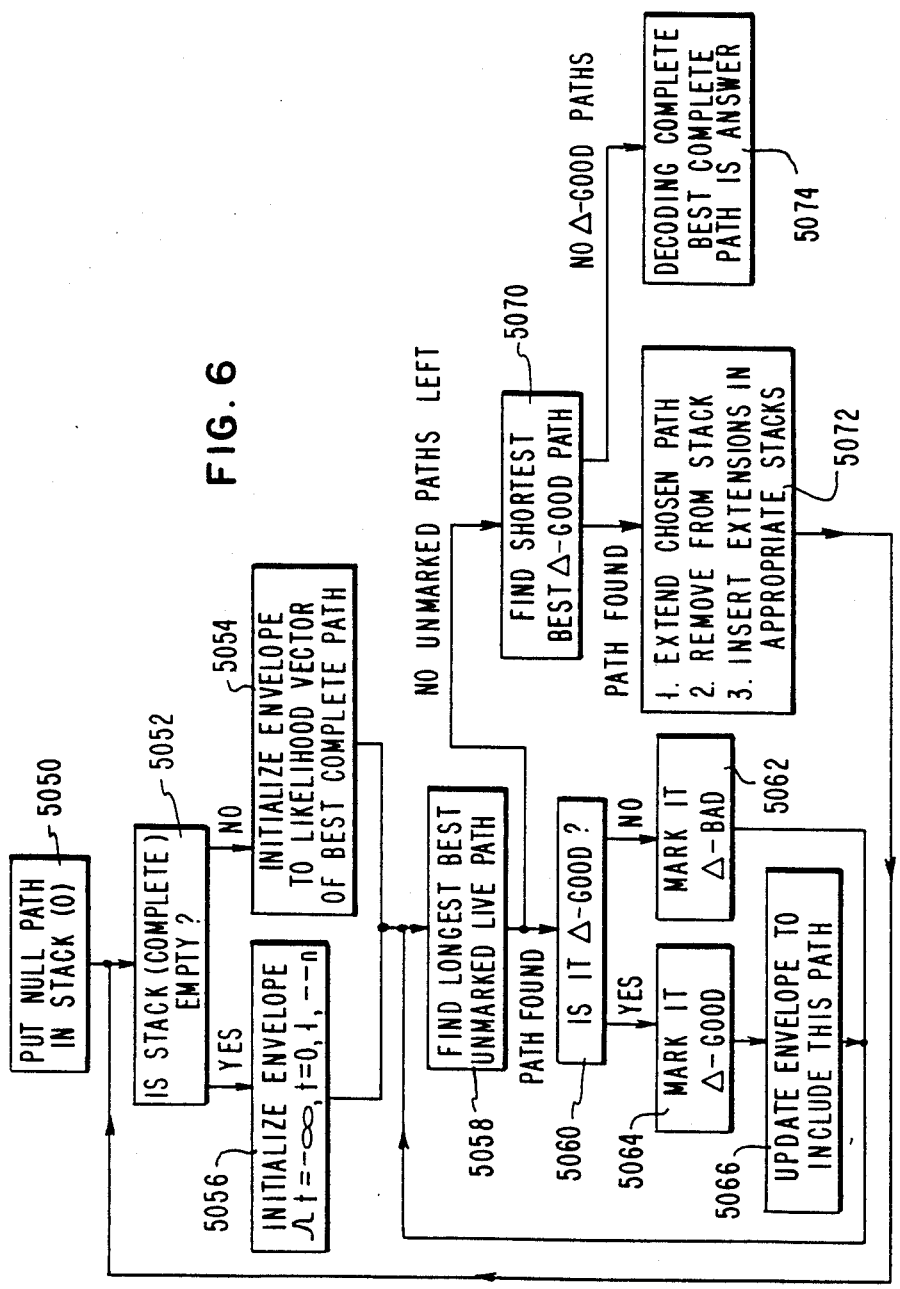
FIG. 6 is a flowchart representing steps in a stack decoding procedure.

Forming the likelihood envelope and determining which word paths are "good" are interrelated as suggested by the sample flowchart of FIG. 6.

Figure 7:
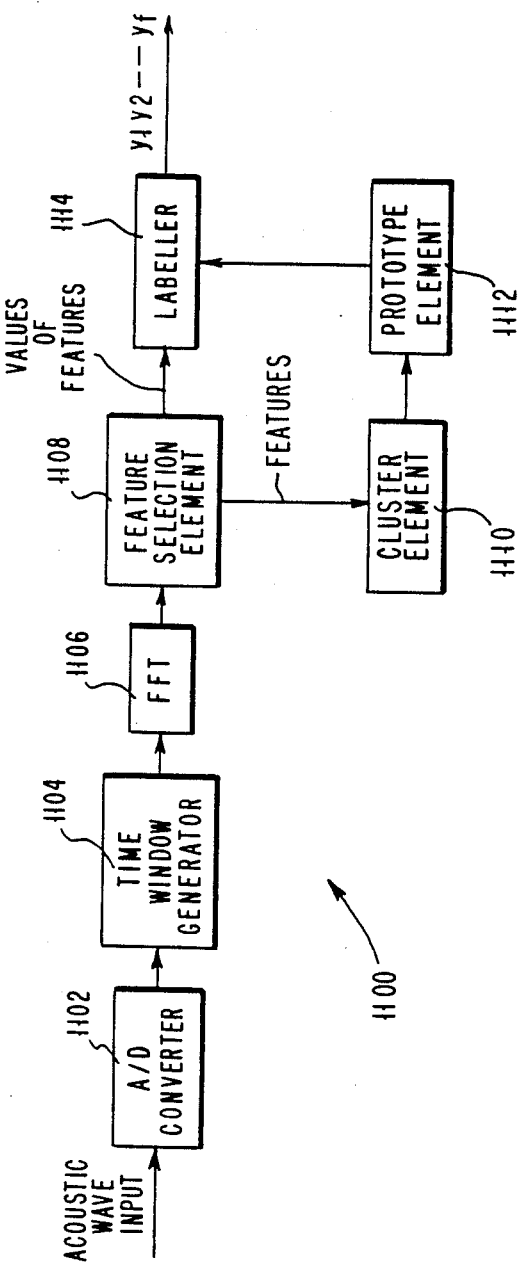
FIG. 7 is an illustration depicting the elements of an acoustic processor.

B. The Auditory Model and Implementation Thereof in an Acoustic Processor of a Speech Recognition System In FIG. 7 a specific embodiment of an acoustic processor 1100, as described above, is illustrated. An acoustic wave input (e.g., natural speech) enters an analog-to-digital converter 1102 which samples at a prescribed rate. A typical sampling rate is one sample every 50 microseconds. To shape the edges of the digital signal, a time window generator 1104 is provided. The output of the window 1104 enters a fast Fourier transform (FFT) element 1106 which provides a frequency spectrum output for each time window.

The output of the FFT element 1106 is then processed to produce labels $L_1 L_2—L_f$. Four elements—a feature selection element 1108, a cluster element 1110, a prototype element 1112, and a labeller 1114—coact to generate the labels. In generating the labels, all speech is defined as a spectral space wherein each component of the space corresponds to a predefined feature—such as energy in a given frequency band. For example, 20 energy levels (one for each of 20 frequency bands) could be used in defining a 20-dimensional space. The features employed are selected by the feature selection element 1108, which supplies the features to the cluster element 1110. Given the features which define the space, the cluster element 1110 partitions the space into clusters. Numerous methods of clustering—well-known to those skilled in the speech recognition art—may be employed. Based on the clusters, a prototype vector is generated for each cluster by a prototype element 1112. The prototype for a cluster may correspond to the centroid of the cluster or to some other identifiable characteristic of the cluster. Stated otherwise, the prototype element 1112 represents each cluster by a prototype vector (or point in space). For each cluster, there is a prototype vector stored in the prototype element.

The feature selection element 1108 also processes the output of the FFT element 1106. The transform output is processed by the feature selection element 1108 to provide values for each of the selected features. Taken together, the values for the various features represent an acoustic input vector in which each component corresponds to a feature value. The labeller 1114 compares the acoustic input vector to each prototype vector stored in the prototype element 1112. The prototype vechro which is closest—by some predefined distance measure—is determined and assigned to the acoustic input. For one acoustic input vector after another, one prototype vector after another is determined. Where each prototype vector is identified with a label, the labeller 1114 produces a label for each acoustic input vector. The general concept of assigning labels to an acoustic input is known in applications other than for speech recognition. Such techniques and labellers related thereto may be applied for use in the presently described acoustic processor 1100.

The selection of appropriate features is a key factor in deriving labels which represent the acoustic (speech) wave input. The presently described acoustic processor includes an improved feature selection element 1108. In accordance with the acoustic processor described herein, an auditory model is derived and applied in an acoustic processor of a speech recognition system. In explaining the auditory model, reference is made to FIG. 8.

Figure 8:
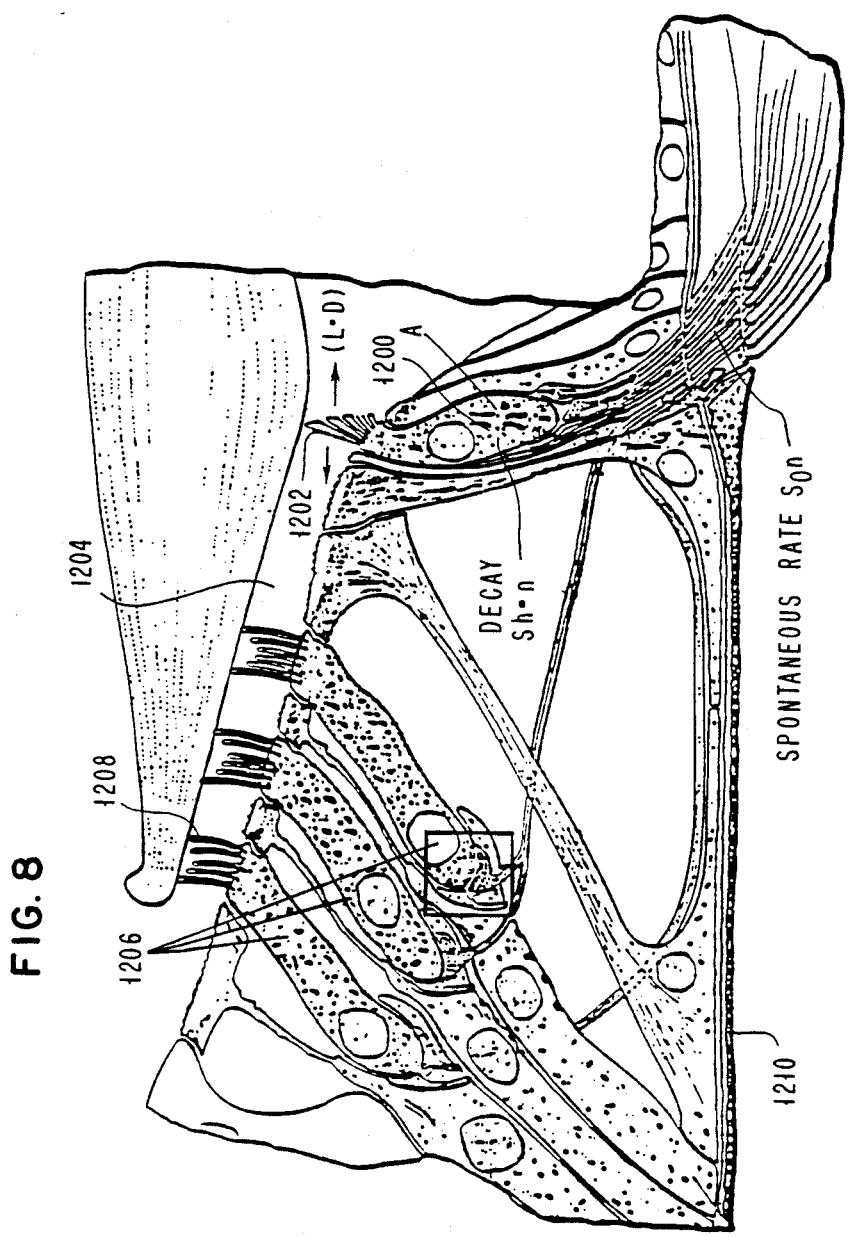
FIG. 8 is an illustration of a typical human ear indicating where components of an acoustic model are defined.

FIG. 8 shows part of the inner human ear. Specifically, an inner hair cell 1200 is shown with end portions 1202 extending therefrom into a fluid-containing channel 1204. Upstream from inner hair cells are outer hair cells 1206 also shown with end portions 1208 extending into the channel 1204. Associated with the inner hair cell 1200 and outer hair cells 1206 are nerves which convey information to the brain. Specifically, nerve neurons undergo electrochemical changes which result in electrical impulses being conveyed along a nerve to the brain for processing. Effectuation of the electrochemical changes, is stimulated by the mechanical motion of the basilar membrane 1210.

It has been recognized, in prior teachings, that the basilar membrane 1210 serves as a frequency analyzer for acoustic waveform inputs and that portions along the basilar membrane 1210 respond to respective critical frequency bands. That different portions of the basilar membrane 1210 respond to corresponding frequency bands has an impact on the loudness perceived for an acoustic waveform input. That is, the loudness of tones is perceived to be greater when two tones are in different critical frequency bands than when two tones of similar power intensity occupy the same frequency band. It has been found that there are on the order of twenty-two critical frequency bands defined by the basilar membrane 1210.

Conforming to the frequency-response of the basilar membrane 1210, the present acoustic processor 1100 in its preferred form physically defines the acoustic waveform input into some or all of the critical frequency bands and then examines the signal component for each defined critical frequency band separately. This function is achieved by appropriately filtering the signal from the FFT element 1106 (see FIG. 7) to provide a separate signal in the feature selection element 1108 for each examined critical frequency band.

The separate inputs, it is noted, have also been blocked into time frames (of preferably 25.6 msec) by the time window generator 1104. Hence, the feature selection element 1108 preferably includes twenty-two signals—each of which represents sound intensity in a given frequency band for one frame in time after another.

Figure 9:
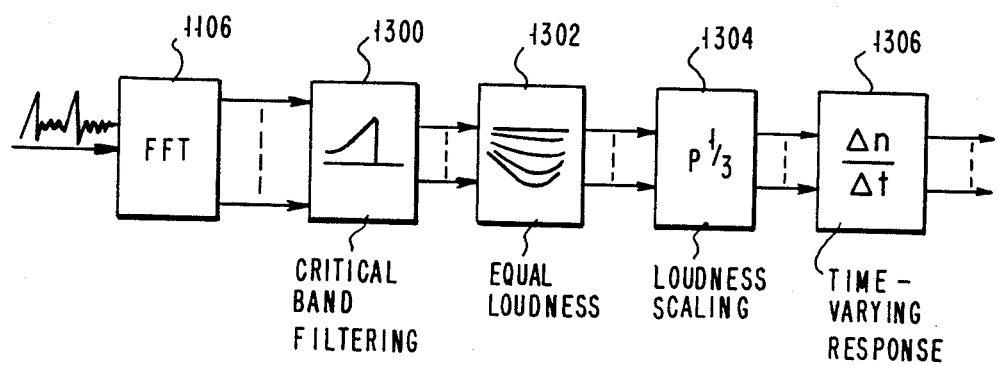
FIG. 9 is a block diagram showing portions of the acoustic processor.
Figure 10:
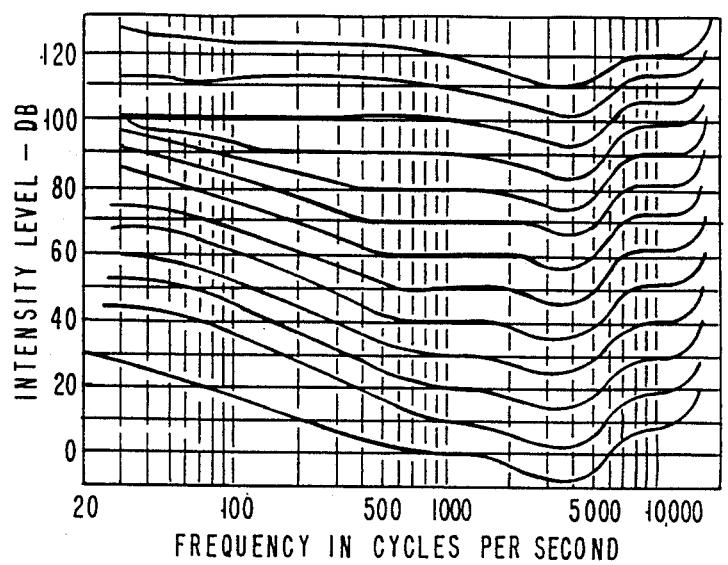
FIG. 10 is a graph showing sound intensity versus frequency, the graph being used in the design of the acoustic processor.

The filtering is preferably performed by a conventional critical band filter 1300 of FIG. 9. The separate signals are then processed by an equal loudness converter 1302 which accounts for perceived loudness variations as a function of frequency. In this regard, it is noted that a first tone at a given dB level at one frequency may differ in perceived loudness from a second tone at the same given dB level at a second frequency. The converter 1302 can be based on empirical data, converting the signals in the various frequency bands so that each is measured by a similar loudness scale. For example, the converter 1302 preferably map from acoustic power to equal loudness based on studies of Fletcher and Munson in 1933, subject to certain modifications. The modified results of these studies are depicted in FIG. 10. In accordance with FIG. 10, a 1 KHz tone at 40 dB is comparable in loudness level to a 100 Hz tone at 60 dB as shown by the X in the figure.

The converter 1302 adjusts loudness preferably in accordance with the contours of FIG. 10 to effect equal loudness regardless of frequency.

In addition to dependence on frequency, power changes and loudness changes do not correspond as one looks at a single frequency in FIG. 10. That is, variations in the sound intensity, or amplitude, are not at all points reflected by similar changes in perceived loudness. For example, at 100 Hz, the perceived change in loudness of a 10 dB change at about 110 dB is much larger than the perceived change in loudness of a 10 dB change at 20 dB. This difference is addressed by a loudness scaling element 1304 which compresses loudness in a predefined fashion. Preferably, the loudness scaling element compresses power P by a cube-root factor to $P^{\frac{1}{3}}$ by replacing loudness amplitude measure in phons by sones.

Figure 11:
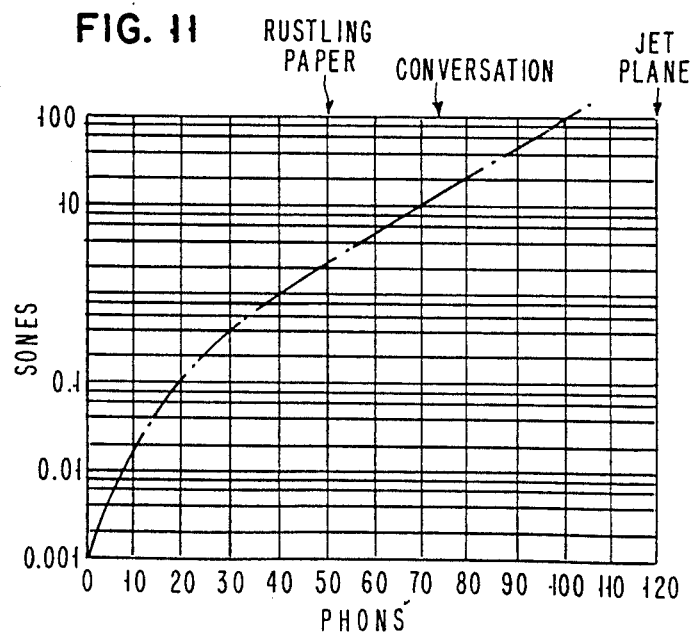
FIG. 11 is a graph showing the relationship between sones and phons.

FIG. 11 illustrates a known representation of phons versus sones determined empirically. By employing sones, the present model remains substantially accurate at large speech signal amplitudes. One sone, it should be recognized, has been defined as the loudness of a 1 KHz tone at 40 dB.

Referring again to FIG. 9, a novel time varying response element 1306 is shown which acts on the equal loudness, loudness scaled signals associated with each critical frequency band. Specifically, for each frequency band examined, a neural firing rate f is determined at each time frame. The firing rate f is defined in accordance with the present processor as:

$$f = (S_o + DL)n \quad (1)$$

where n is an amount of neurotransmitter; $S_o$ is a spontaneous firing constant which relates to neural firings independent of acoustic waveform input; L is a measurement of loudness; and D is a displacement constant. $(S_o)n$ corresponds to the spontaneous neural firing rate which occurs whether or not there is an acoustic wave input and DLn corresponds to the firing rate due to the acoustic wave input.

Significantly, the value of n is characterized by the present acoustic processor as changing over time according to the relationship:

$$dn/dt = Ao - (So + Sh + DL)n \quad (2)$$

where Ao is a replenishment constant and Sh is a spontaneous neurotransmitter decay constant. The novel relationship set forth in equation (2) takes into account that neurotransmitter is being produced at a certain rate (Ao) and is lost (a) through decay (Sh×n), (b) through spontaneous firing (So×n), and (c) through neural firing due to acoustic wave input (DL×n). The presumed locations of these modelled phenomena are illustrated in FIG. 8.

Equation (2) also reflects the fact that the present acoustic processor is non-linear in that the next amount of neurotransmitter and the next firing rate are dependent multiplicatively on the current conditions of at least the neurotransmitter amount. That is, the amount of neurotransmitter at a state $(t+\Delta t)$ is equal to the amount of neurotransmitter at a state t plus dn/dt, or:

$$n(t+\Delta t) = n(t) + dn/dt \, \Delta t \quad (3)$$

Equations (1), (2), and (3) describe a time varying signal analyzer which, it is suggested, addresses the fact that the auditory system appears to be adaptive over time, causing signals on the auditory nerve to be non-linearly related to acoustic wave input. In this regard, the present acoustic processor provides the first model which embodies non-linear signal processing in a speech recognition system, so as to better conform to apparent time variations in the nervous system.

In order to reduce the number of unknowns in equations (1) and (2), the present acoustic processor uses the following equation (4) which applies to fixed loudness L:

$$So + Sh + DL = 1/T \quad (4)$$

T is a measure of the time it taker for an auditory response to drop to 37% of its maximum after an audio wave input is generated. T, it is noted, is a function of loudness and is, according to the present acoustic processor, derived from existing graphs which display the decay of the response for various loudness levels. That is, when a tone of fixed loudness is generated, it generates a response at a first high level after which the response decays toward a steady condition level with a time constant T With no acoustic wave input, $T = T_O$ which is on the order of 50 msec. For a loudness of $L_{max}$, $T = T_{max}$ which is on the order of 30 msec. By setting Ao=1, 1/(So+Sh) is determined to be 5 csec, when L=0. When L is $L_{max}$ and $L_{max} = 20$ sones, equation (5) results:

$$So + Sn + D(20) = 1/30 \quad (5)$$

With the above data and equations, So and Sh are defined by equations (6) and (7) as:

$$So = DL_{max}/(R + (DL_{max}T_0R) - 1) \quad (6)$$

$$Sh = 1/T_0 - So \quad (7)$$

where $$R = \frac{f_{steady\ state}|L_{max}}{f_{steady\ state}|L = 0} \quad (8)$$

$f_{steady\ state}|$ represents the firing rate at a given loudness when dn/dt is zero.

R, it is noted, is the only variable left in the acoustic processor. Hence, to alter the performance of the processor, only R is changed. R, that is, is a single parameter which may be adjusted to alter performance which, normally, means minimizing steady state effects relative to transient effects. It is desired to minimize steady state effects because inconsistent output patterns for similar speech inputs generally result from differences in frequency response, speaker differences, background noise, and distortion which affect the steady state portions of the speech signal but not the transient portions. The value of R is preferably set by optimizing the error rate of the complete speech recognition system. A suitable value found in this way is R=1.5. Values of So and Sh are then 0.0888 and 0.11111 respectively, with D being derived as 0.00666.

Figure 12:
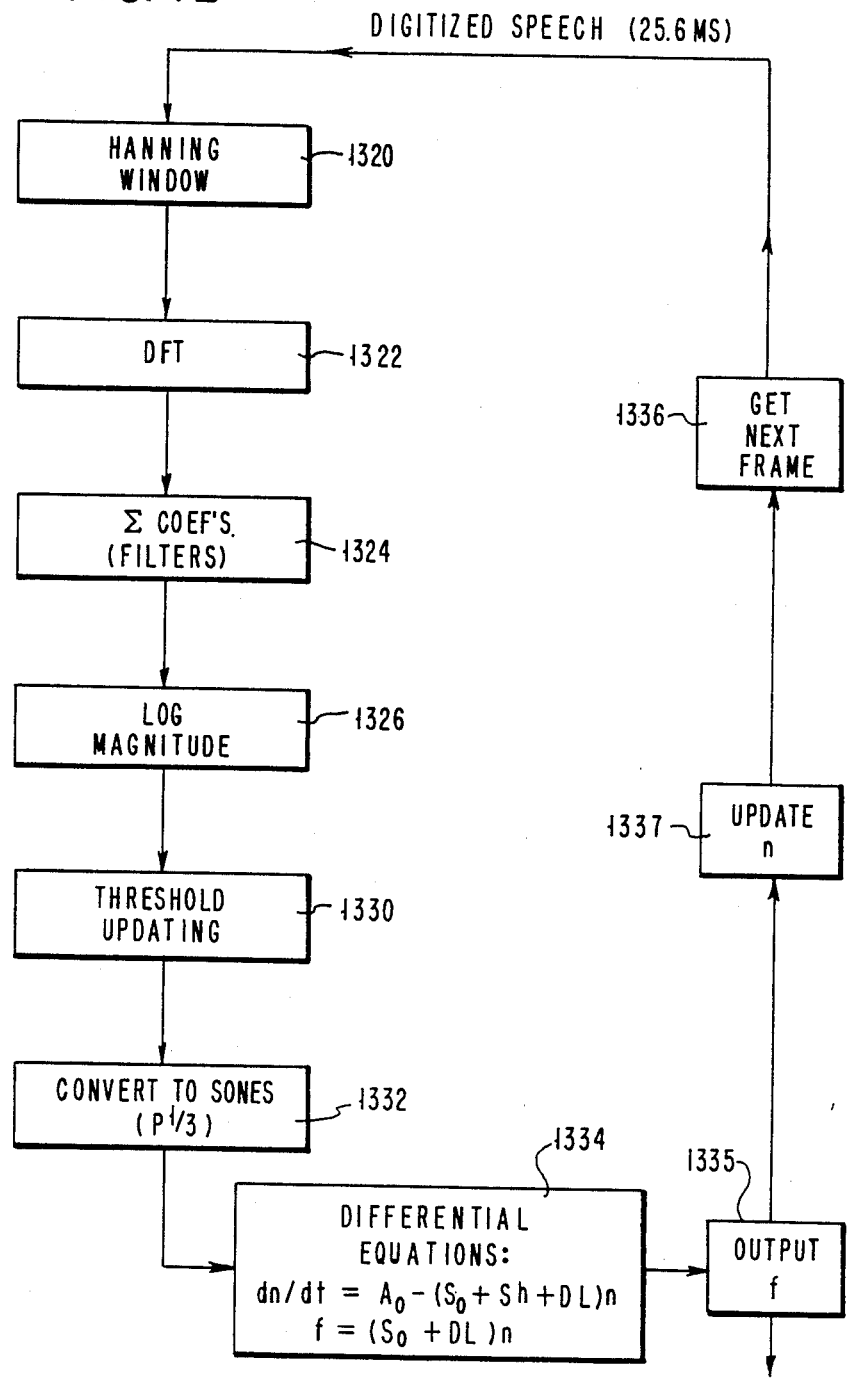
FIG. 12 is a flowchart representation showing how sound is characterized according to the acoustic processor of FIG. 7.

Referring to FIG. 12, a flowchart of the present acoustic processor is depicted. Digitized speech in a 25.6 msec time frame, sampled at preferably 20 KHz passes through a Hanning Window 1320 the output from which is subject to a Fourier Transform 1322, taken at preferably 10 msec intervals. The transform output is filtered by element 1324 to provide a power density output for each of at least one frequency band—preferably all the critical frequency bands or at least twenty thereof. The power density is then transformed from log magnitude 1326 to loudness level. This is readily performed according to the modified graph of FIG. 10. The process outlined hereafter which includes threshold up-dating of step 1330 is depicted in FIG. 13.

Figure 13:
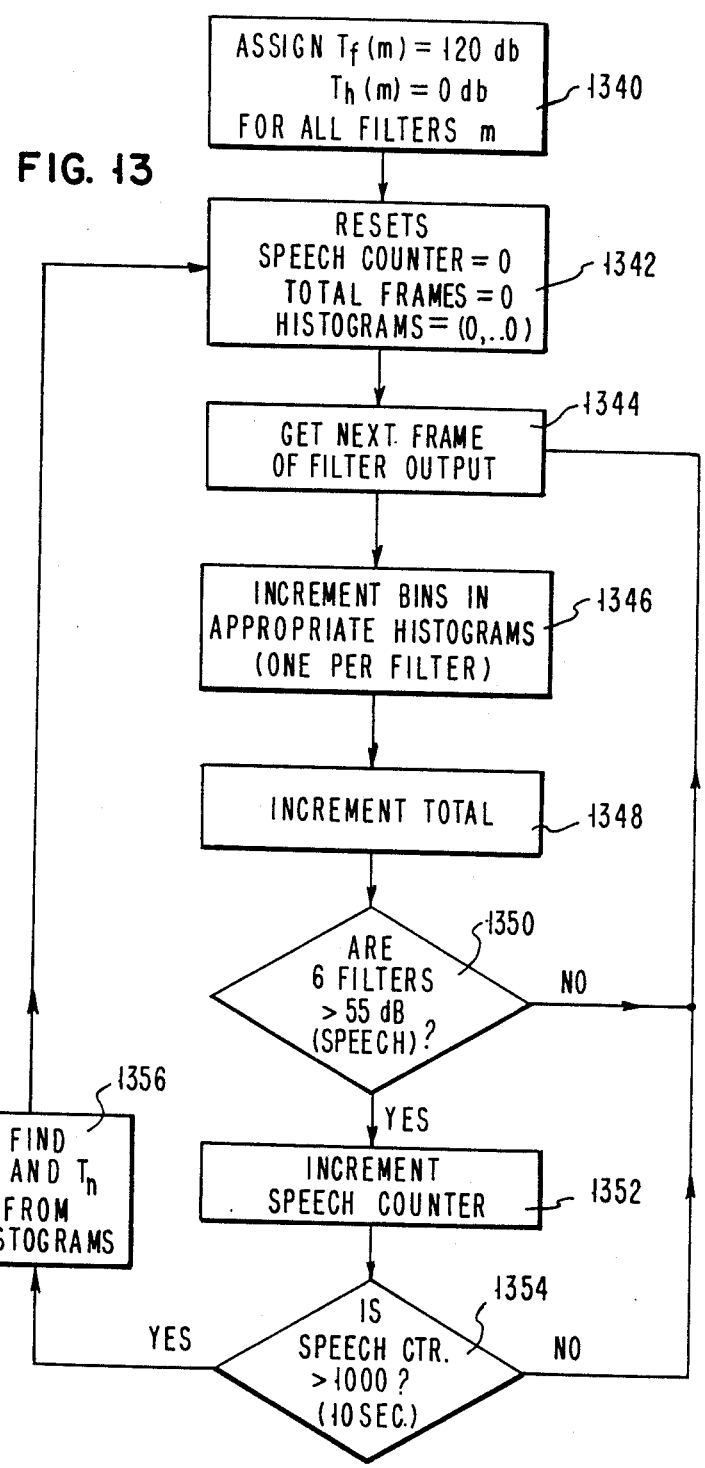
FIG. 13 is a flowchart representation showing how thresholds are up-dated in FIG. 12.

In FIG. 13, a threshold-of-feeling $T_f$ and a threshold-of-hearing $T_h$ are initially defined (at step 1340) for each filtered frequency band m to be 120 dB and 0 dB respectively. Thereafter, a speech counter, total frames register, and a histogram register are reset at step 1342.

Each histogram includes bins, each of which indicates the number of samples or counts during which power or some similar measure—in a given frequency band—is in a respective range. A histogram in the present instance preferably represents—for each given frequency band—the number of centiseconds during which loudness is in each of a plurality of loudness ranges. For example, in the third frequency band, there may be twenty centiseconds between 10 dB and 20 dB in power. Similarly, in the twentieth frequency band, there may be one hundred fifty out of a total of one thousand centiseconds between 50 dB and 60 dB. From the total number of samples (or centiseconds) and the counts contained in the bins, percentiles are derived.

A frame from the filter output of a respective frequency band is examined at step 1344 and bins in the appropriate histograms—one per filter—are incremented at step 1346. The total number of bins in which the amplitude exceeds 55 dB are summed for each filter (i.e. frequency band) at step 1348 and the number of filters indicating the presence of speech is determined. If there is not a minimum of filters (e.g. six of twenty) to suggest speech, the next frame is examined at step 1344. If there are enough filters to indicate speech at step 1350, a speech counter is incremented at step 1352. The speech counter is incremented at step 1352 until 10 seconds of speech have occurred at step 1354 whereupon new values for $T_f$ and $T_h$ are defined for each filter at step 1356.

The new $T_f$ and $T_h$ values are determined for a given filter as follows. For $T_f$, the dB value of the bin holding the 35th sample from the top of 1000 bins (i.e. the 96.5th percentile of speech) is defined as $BIN_H$. $T_f$ is then set as: $T_f = BIN_H + 40$ dB. For $T_h$, the dB value of the bin holding the 0.01) (TOTAL BINS - SPEECH COUNT) th value from the lowest bin is defined as $BIN_L$. That is, $BIN_L$ is the bin in the histogram which is 1% of the number of samples in the histogram excluding the number of samples classified as speech. $T_h$ is then defined as:

$$T_h = BIN_L - 30 \text{ dB}.$$

Returning to FIG. 12, the sound amplitudes are converted to sones and scaled based on the updated thresholds (steps 1330 and 1332) as described hereinbefore. An alternative method of deriving sones and scaling is by taking the filter amplitudes "a" (after the bins have been incremented) and converting to dB according to the expression:

$$a^{dB} = 20 \log_{10}(a) - 10 \qquad (9)$$

Each filter amplitude is then scaled to a range between 0 and 120 to provide equal loudness according to the expression:

$$a^{eq1} = 120(a^{dB} - T_h)/(T_f - T_h) \qquad (10)$$

$a^{eq1}$ is then preferably converted from a loudness level (phons) to an approximation of loudness in sones (with a 1 KHz signal at 40 dB mapping to 1) by the expression:

$$L^{dB} = (a^{eq1} - 30)/4 \qquad (11)$$

Loudness in sones is then approximated as:

$$L_s(\text{appr}) = 10(L^{dB})/20 \qquad (12)$$

The loudness in sones $L_s$ is then provided as input to the equations (1) and (2) at step 1334 to determine the output firing rate f for each frequency band (step 1335). With twenty-two frequency bands, a twenty-two dimension vector characterizes the acoustic wave inputs over successive time frames. Generally, however, twenty frequency bands are examined by employing a conventional mel-scaled filter bank.

Prior to processing the next time frame (step 1336), the next state of n is determined in accordance with equation (3) in step 1337.

The acoustic processor hereinbefore described is subject to improvement in applications where the firing rate f and neurotransmitter amount n have large DC pedestals. That is, where the dynamic range of the terms of the f and n equations is important, the following equations are derived to reduce the pedestal height.

In the steady state, and in the absence of an acoustic wave input signal (L=0), equation (2) can be solved for a steady-state internal state n':

$$n' = A/(S_o + S_h) \qquad (13)$$

The internal state of the neurotransmitter amount n(t) can be represented as a steady state portion and a varying portion:

$$n(t) = n' + n''(t) \qquad (14)$$

Combining equations (1) and (14), the following expression for the firing rate results:

$$f(t) = (S_o + D \times L)(n' + n''(t)) \qquad (15)$$

The term $S_o \times n'$ is a constant, while all other terms include either the varying part of n or the input signal represented by $(D \times L)$. Future processing will involve only the squared differences between output vectors, so that processing will involve only the squared differences between output vectors, so that constant terms may be disregarded. Including equation (13) for n', we get $$f''(t) = (S_o + D \times L) \times ((n''(t) + D \times L \times A)/(S_o + S_h)) \qquad (16)$$

Considering equation (3), the next state becomes:

$$n(t + \Delta t) = n'(t + \Delta t) + n''(t + \Delta t) \qquad (17)$$

$$= n''(t) + A - (S_o + S_h + D \times L) \times (n' + n''(t)) \qquad (18)$$

$$= n''(t) - (S_h \times n''(t) - (S_o + A_o \times L^A) \\ n''(t) - (A_o \times L^A \times D)/(S_o + S_h) + A_o - (- \\ S_o \times A_o) + (S_n \times A_o)0/(S_o + S_h) \qquad (19)$$

This equation (19) may be rewritten, ignoring all constant terms, as:

$$n''(t + \Delta t) = n''(t)(1 - S_o \Delta t) - f''(t) \qquad (20)$$

Equations (15) and (20) now constitute the output equations and state-update equations applied to each filter during each 10 millisecond time frame. The result of applying these equations is a 20 element vector each 10 milliseconds, each element of the vector corresponding to a firing rate for a respective frequency band in the mel-scaled filter bank.

With respect to the embodiment set forth immediately hereinabove, the flowchart of FIG. 13 applies except that the equations for f, dn/dt, and n(t+1) are replaced by equations (11) and (16) which define special case expressions for firing rate f and next state n (t+$\Delta$t) respectively.

It is to be noted that the values attributed to the terms in the various equations (namely $t_0 = 5$ csec, $t_{Lmax} = 3$ csec, $A_o = 1$, $R = 1.5$, and $L_{max} = 20$) may be set otherwise and the terms $S_o$, $S_h$, and D may differ from the preferable derived values of 0.0888, 0.11111, and 0.00666, respectively, as other terms are set differently.

The present acoustic model has been practiced using the PL/I programming language with Floating Point Systems FPS 190L hardware, however the model may be practiced by various other software or hardware approaches.

C. Detailed Match

In FIG. 3, a sample detailed match phone machine 2000 is depicted. Each detailed match phone machine is a probabilistic finite-state machine characterized by (a) a plurality of states $S_i$, (b) a plurality of transitions $tr(S_j, S_i)$, some of the transitions extending between different states and some extending from a state back to itself, each transition having associated therewith a corresponding probability, and (c) for each label that can be generated at a particular transition, a corresponding actual label probability.

In FIG. 3, seven states $S_1$ through $S_7$ are provided and thirteen transitions tr1 through tr13 are provided in the detailed match phone machine 2000. A review of FIG. 3 shows that phone machine 2000 has three transitions with dashed line paths, namely transitions tr11, tr12, and tr13. At each of these three transitions, the phone can change from one state to another without producing a label and such a transition is, accordingly, referred to as a null transition. Along transitions tr1 through tr10 labels can be produced. Specifically, along each transition tr1 through tr10, one or more labels may have a distinct probability of being generated thereat. Preferably, for each transition there is a probability associated with each label that can be generated in the system. That is, if there are two hundred labels that can be selectively generated by the acoustic channel, each transition (that is not a null) has two hundred "actual label probabilities" associated therewith—each of which corresponds to the probability that a corresponding label which is generated by the phone at the particular transition. The actual label probabilities for transition tr1 are represented by the symbol p followed by the bracketed column of numerals 1 through 200, each numeral representing a given label. For label 1, there is a probability p[1] that the detailed phone machine 2000 generates the label 1 at transition tr1. The various actual label probabilities are stored with relation to the label and a corresponding transition.

When a string of labels $y_1 y_2 y_3$—is presented to a detailed match phone machine 2000 corresponding to a given phone, a match procedure is performed. The procedure associated with the detailed match phone machine is explained with reference to FIG. 14.

Figure 14:
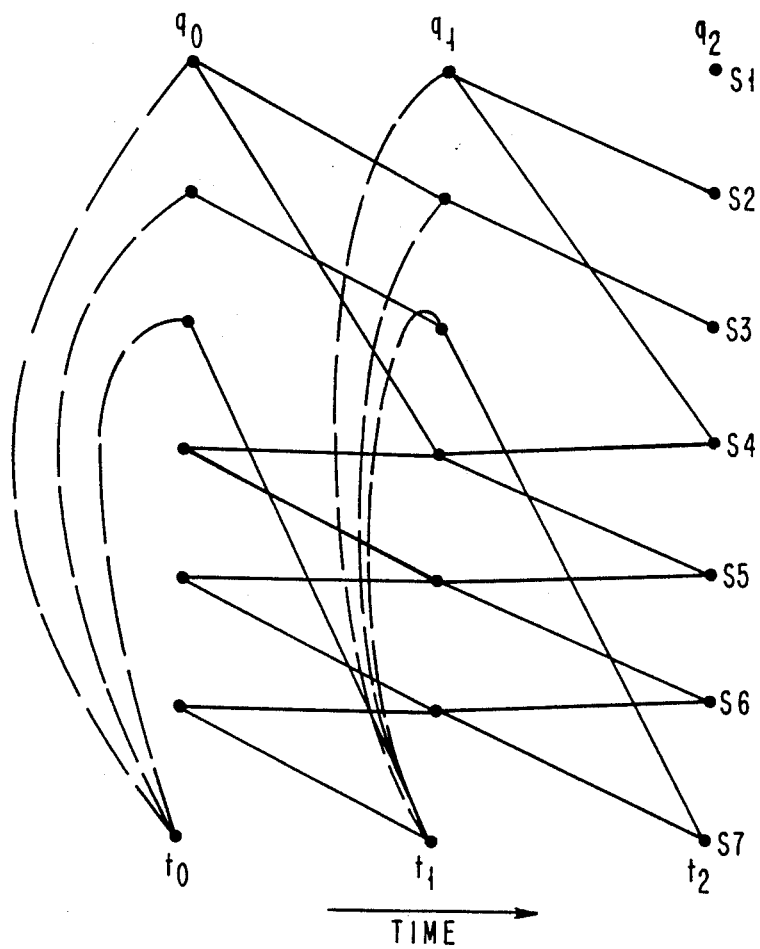
FIG. 14 is a trellis diagram, or lattice, of a detailed match procedure.

FIG. 14 is trellis diagram of the phone machine of FIG. 3. As in the phone machine, the trellis diagram shows a null transition from state $S_1$ to state $S_7$ and transitions from state $S_1$ to state $S_2$ and from state $S_1$ to state $S_4$. The transitions between other states are also illustrated. The trellis diagram also shows time measured in the horizontal direction. Start-time probabilities $q_0$ and $q_1$ represent the probabilities that a phone has a start time at time $t = t_0$ or $t = t_1$, respectively, for the phone. At each start time $t_0$ and $t_1$, the various transitions are shown. It should be noted, in this regard, that the interval between successive start (and end) times is preferably equal in length to the time interval of a label.

In employing the detailed match phone machine 2000 to determine how closely a given phone matches the labels of an incoming string, an end-time distribution for the phone is sought and used in determining a match value for the phone. The notion of relying on the end-time distribution is common to all embodiments of phone machines discussed herein relative to a matching procedure. In generating the end-time distribution to perform a detailed match, the detailed match phone machine 2000 involves computations which are exact and complicated.

Looking at the trellis diagram of FIG. 14, we first consider the computations required to have both a start time and end time at time $t = t_0$. For this to be the case according to the example phone machine structure set forth in FIG. 3, the following probability applies:

$$Pr(S_7, t=t_0) = q_0 \times T(1 \to 7) + Pr(S_2, t=t_0) \times T(2 \to 7) + Pr(S_3, t=t_0) \times T(3 \to 7) \quad (21)$$

where Pr represents "probability of" and T represents the transition probability between the two parenthetically identified states. The above equation indicates the respective probabilities for the three conditions under which the end time can occur at time $t = t_0$. Moreover, it is observed that the end time at $t = t_0$ is limited in the current example to occurrence at state $S_7$.

Looking next at the end time $t = t_1$, it is noted that a calculation relating to every state other than state $S_1$ must be made. The state $S_1$ starts at the end time of the previous phone. For purposes of explanation, only the calculations pertaining to state $S_4$ are set forth.

For state $S_4$, the calculation is:

$$Pr(S_4, t=t_1) = Pr(S_1, t=t_0) \times T(1 \to 4) \times Pr(y_1 | 1 \to 4) + Pr(S_4, t=t_0) \times T(4 \to 4) \times Pr(y | 4 \to 4) \quad (22)$$

In words, the equation (22) set forth immediately above indicates that the probability of the phone machine being in state $S_4$ at time $t = t_1$ is dependent on the sum of the following two terms (a) the probability of being at state $S_1$ at time $t = t_0$ multiplied by the probability (T) of the transition from state $S_1$ to state $S_4$ multiplied further by the probability (Pr) of a given label —y— the string being generated given a transition from state $S_1$ to state $S_4$ and (b) the probability of being at state $S_4$ at time $t = t_0$ multiplied by the probability of the transition from state $S_4$ to itself and further multiplied by the probability of generating the given label —y— during and given the transition from state $S_4$ to itself.

Similarly, calculations pertaining to the other states (excluding state $S_1$) are also performed to generate corresponding probabilities that the phone is at a particular state at time $t = t_1$. Generally, in determining the probability of being at a subject state at a given time, the detailed match (a) recognizes each previous state that has a transition which leads to the subject state and the respective probability of each such previous state; (b) recognizes, for each such previous state, a value representing the probability of the label that must be generated at the transistor between each such previous state and the current stator in order to conform to the label string; and (c) combines the probability of each previous state and the respective value representing the label probability to provide a subject state probability over a corresponding transition. The overall probability of being at the subject state is determined from the subject state probabilities over all transitions leading thereto. The calculation for state $S_7$, it is noted, includes terms relating to the three null transitions which permit the phone to start and end at time $t = t_1$ with the phone ending in state $S_7$.

As with the probability determinations relative to times $t = t_0$ and $t = t_1$, probability determinations for a series of other end times are preferably generated to form an end-time distribution. The value of the end-time distribution for a given phone provides an indication of how well the given phone matches the incoming labels.

In determining how well a word matches a string of incoming labels, the phones which represent the word are processed in sequence. Each phone generates an end-time distribution of probability values. A match value for the phone is obtained by summing up the end-time probabilities and then taking the logarithm of that sum. A start-time distribution for the next phone is derived by normalizing the end-time distribution by, for example, scaling each value thereof by dividing each value by the sum so that the sum of scaled values totals one.

It should be realized that there are at least two methods of determining h, the number of phones to be examined for a given word or word string. In a depth first method, computation is made along a baseform—computing a running subtotal with each successive phone. When the subtotal is found to be below a predefined threshold for a given phone position therealong, the computation terminates. Alternatively, in a breadth first method, a computation for similar phone positions in each word is made. The computations following the first phone in each word, the second phone in each word, and so on are made. In the breadth first method, the computations along the same number of phones for the various words are compared at the same relative phone positions therealong. In either method, the word(s) having the largest sum of match values is the sought object.

The detailed match has been implemented in APAL (Array Processor Assembly Language) which is the native assembler for the Floating Point Systems, Inc. 190L. In this regard, it should be recognized that the detailed match requires considerable memory for storing each of the actual label probabilities (i.e., the probability that a given phone generates a given label y at a given transition); the transition probabilities for each phone machine; and the probabilities of a given phone being at a given state at a given time after a defined start time. The above-noted FPS 190L is set up to make the various computations of end times, match values based on, for example, a sum—preferably the logarithmic sum of end time probabilities; start times based on the previously generated end time probabilities; and word match scores based on the match values for sequential phones in a word. In addition, the detailed match preferably accounts for "tail probabilities" in the matching procedure. A tail probability measures the likelihood of successive labels without regard to words. In a simple embodiment, a given tail probability corresponds to the likelihood of a label following another label. This likelihood is readily determined from strings of labels generated by, for example, some sample speech.

Hence, the detailed match provides sufficient storage to contain baseforms, statistics for the Markov models, and tail probabilities. For a 5000 word vocabulary where each word comprises approximately ten phones, the baseforms have a memory requirement of 5000×10. Where there are 70 distinct phones (with a Markov model for each phone) and 200 distinct labels and ten transitions at which any label has a probability of being produced, the statistics would require 70×10×200 locations. However, it is preferred that the phone machines are divided into three portions—a start portion, a middle portion, and an end portion—with statistics corresponding thereto. (The three self-loops are preferably included in successive portions.) Accordingly, the storage requirements are reduced to 70×3×200. With regard to the tail probabilities, 200×200 storage locations are needed. In this arrangement, 50K integer and 82K floating point storage performs satisfactorily.

Moreover, it should be noted that earlier generations of the system have included 70 different phones, but the present invention provides for on the order of 96 phones with respective phone machines.

D. Basic Fast Match

Because the detailed match is computationally expensive, a basic fast match and an alternative fast match which reduces the computation requirements without sacrificing accuracy is provided. The fast match is preferably used in conjunction with the detailed match, the fast match listing likely candidate words from the vocabulary and the detailed match being performed on, at most, the candidate words on the list.

A fast approximate acoustic matching technique is the subject of the co-pending patent application entitled "Apparatus and Method of Performing Acoustic Matching". In the fast approximate acoustic match, preferably each phone machine is simplified by replacing the actual label probability for each label at all transitions in a given phone machine with a specific replacement value. The specific replacement value is preferably selected so that the match value for a given phone when the replacement values are used is an overestimation of the match value achieved by the detailed match when the replacement values do not replace the actual label probabilities. One way of assuring this condition is by selecting each replacement value so that no probability corresponding to a given label in a given phone machine is greater than the replacement value thereof. By substituting the actual label probabilities in a phone machine with corresponding replacement values, the number of required computations in determining a match score for a word is reduced greatly. Moreover, since the replacement value is preferably an overestimation, the resulting match score is not less than would have previously been determined without the replacement.

In a specific embodiment of performing an acoustic match in a linguistic decoder with Markov models, each phone machine therein is characterized—by training—to have (a) a plurality of states and transition paths between states, (b) transitions $tr(S_j|S_i)$ having probabilities $T(i \rightarrow j)$ each of which represents the probability of a transition to a state $S_j$ given a current state $S_i$ where Si and Sj may be the same state or different states, and (c) actual label probabilities wherein each actual label probability $p(y_k|i \rightarrow j)$ indicates the probability that a label $y_k$ is produced by a given phone machine at a given transition from one state to a subsequent state where k is a label identifying notation; each phone machine including (a) means for assigning to each $y_k$ in said each phone machine a single specific value $p'(y_k)$ and (b) means for replacing each actual output probability $p(y_k|i \rightarrow j)$ at each transition in a given phone machine by the single specific value $p'(y_k)$ assigned to the corresponding $y_k$. Preferably, the replacement value is at least as great as the maximum actual label probability for the corresponding $y_k$ label at any transition in a particular phone machine. The fast match embodiments are employed to define a list of on the order of ten to one hundred candidate words selected as the most likely words in the vocabulary to correspond to the incoming labels. The candidate words are preferably subjected to the language model and to the detailed match. By paring the number of words considered by the detailed match to on the order of 1% of the words in the vocabulary, the computational cost is greatly reduced while accuracy is maintained.

The basic fast match simplifies the detailed match by replacing with a single value the actual label probabilities for a given label at all transitions at which the given label may be generated in a given phone machine. That is, regardless of the transition in a given phone machine whereat a label has a probability of occurring, the probability is replaced by a single specific value. The value is preferably an overestimate, being at least as great as the largest probability of the label occurring at any transition in the given phone machine.

By setting the label probability replacement value as the maximum of the actual label probabilities for the given label in the given phone machine, it is assured that the match value generated with the basic fast match is at least as high as the match value that would result from employing the detailed match. In this way, the basic fast match typically overestimates the match value of each phone so that more words are generally selected as candidate words. Words considered candidates according to the detailed match also pass muster in accordance with the basic fast match.

Figure 15:
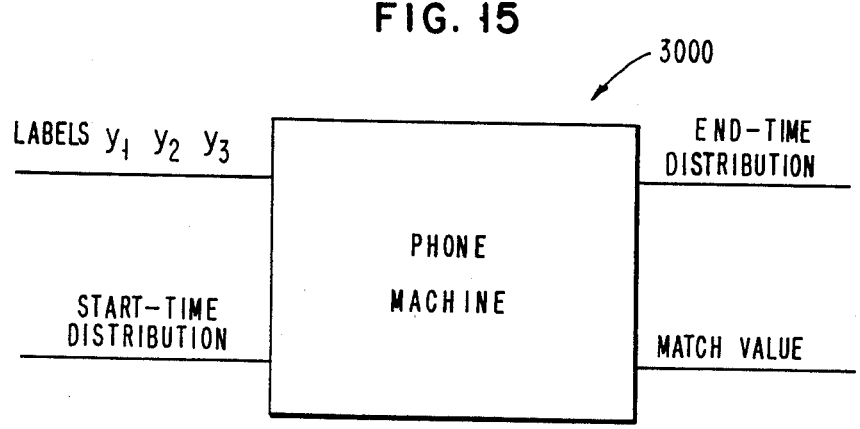
FIG. 15 is a diagram depicting a phone machine used in performing matching.

Referring to FIG. 15, a phone machine 3000 for the basic fast match is illustrated. Labels (also referred to as symbols and fenemes) enter the basic fast match phone machine 3000 together with a start-time distribution. The start-time distribution and the label string input is like that entering the detailed match phone machine described hereinabove. It should be realized that the start time may, on occasion, not be a distribution over a plurality of times but may, instead, represent a precise time—for example following an interval of silence—at which the phone begins. When speech is continuous, however, the end-time distribution is used to define the start-time distribution (as is discussed in greater detail hereinbelow). The phone machine 400 generates an end-time distribution and a match value for the particular phone from the generated end-time distribution. The match score for a word is defined as the sum of match values for component phones—at least the first h phones in the word.

Figure 16:
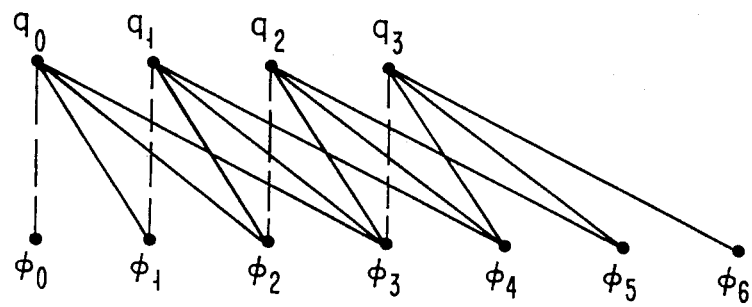
FIG. 16 is a time distribution diagram used in a matching procedure having certain imposed conditions.

Referring now to FIG. 16, a diagram of a basic fast match computation is illustrated. The basic fast match computation is only concerned with the start-time distribution, the number—or length of labels—produced by the phone, and the replacement values $p'_{yk}$ associated with each label $y_k$. By substituting all actual label probabilities for a given label in a given phone machine by a corresponding replacement value, the basic fast match replaces transition probabilities with length distribution probabilities and obviates the need for including actual label probabilities (which can differ for each transition in a given phone machine) and probabilities of being at a given state at a given time.

In this regard, the length distributions are determined from the detailed match model. Specifically, for each length in the length distribution, the procedure preferably examines each state individually and determines for each state the various transition paths by which the currently examined state can occur (a) given a particular label length and (b) regardless of the outputs along the transitions. The probabilities for all transition paths of the particular length to each subject state are summed and the sums for all the subject states are then added to indicate the probability of a given length in the distribution. The above procedure is repeated for each length. In accordance with the preferred form of the matching procedure, these computations are made with reference to a trellis diagram as is known in the art of Markov modelling. For transition paths which share branches along the trellis structure, the computation for each common branch need be made only once and is applied to each path that includes the common branch.

In the diagram of FIG. 16, two limitations are included by way of example. First, it is assumed that the length of labels produced by the phone can be zero, one, two, or three having respective probabilities of $l_0$, $l_1$, $l_2$, and $l_3$. The start time is also limited, permitting only four start times having respective probabilities of $q_0$, $q_1$, $q_2$, and $q_3$ with these limitations, the following equations define the end-time distribution of a subject phone as:

$$\Phi_0 = q_0 l_0$$
$$\Phi_1 = q_1 l_0 + q_0 l_1 p_1$$
$$\Phi_2 = q_2 l_0 + q_1 l_1 p_2 + q_0 l_2 p_1 p_2$$
$$\Phi_3 = q_3 l_0 + q_2 l_1 p_3 + q_1 l_2 p_2 p_3 + q_0 l_3 p_1 p_2 p_3$$
$$\Phi_4 = q_3 l_1 p_4 + q_2 l_2 p_3 p_4 + q_1 l_3 p_2 p_3 p_4$$
$$\Phi_5 = q_3 l_2 p_4 p_5 + q_2 l_3 p_3 p_4 p_5$$
$$\Phi_6 = q_3 l_3 p_4 p_5 p_6$$

In examining the equations, it is observed that $\Phi_3$ includes a term corresponding to each of four start times. The first term represents the probability that the phone starts at time $t=t_3$ and produces a length of zero labels the phone starting and ending at the same time. The second term represents the probability that the phone starts at time $t=t_2$, that the length of labels is one, and that a label 3 is produced by the phone. The third term represents the probability that the phone starts at time $t=t_1$, that the length of labels is two (namely labels 2 and 3), and that labels 2 and 3 are produced by the phone. Similarly, the fourth term represents the probability that the phone starts at time $t=t_0$; that the length of labels is three; and that the three labels 1, 2, and 3 are produced by the phone.

Comparing the computations required in the basic fast match with those required by the detailed match suggest the relative simplicity of the former relative to the latter. In this regard, it is noted that the $p'_{yk}$ value remains the same for each appearance in all the equations as do the label length probabilities. Moreover, with the length and start time limitations, the computations for the later end times become simpler. For example, at $\Phi_6$, the phone must start at time $t=t_3$ and all three labels 4, 5, and 6 must be produced by the phone for that end time to apply.

In generating a match value for a subject phone, the end time probabilities along the defined end-time distribution are summed. If desired, the log of the sum is taken to provide the expression:

$$\text{match value} = \log_{10}(\Phi_0 + \cdots + \Phi_6)$$

As noted previously, a match score for a word is readily determined by summing the match values for successive phones in a particular word.

Figure 17:
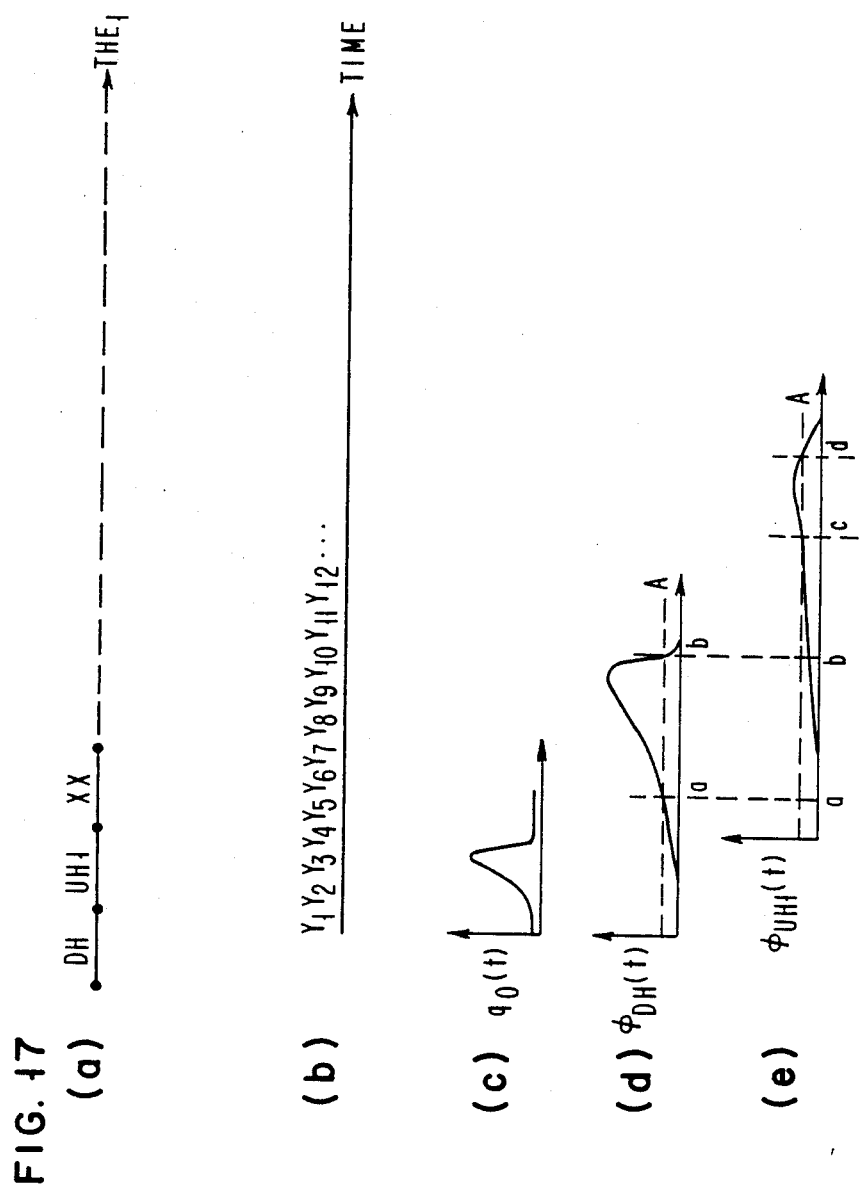
FIGS. 17 (a) through (e) are diagrams which show the interrelationship between phones, a label string, and start and end times determined in the matching procedure.

In describing the generating of the start time distribution, reference is made to FIG. 17. In FIG. 17(a), the word THE$_1$ is repeated, broken down into its component phones. In FIG. 17(b), the string of labels is depicted over time. In FIG. 17(c), a first start-time distribution is shown. The first start-time distribution has been derived from the end-time distribution of the most recent previous phone (in the previous word which may include a "word" of silence). Based on the label inputs and the start-time distribution of FIG. 17(c), the end-time distribution for the phone DH, $\Phi_{DH}$, is generated.

The start-time distribution for the next phone, UH, is determined by recognizing the time during which the previous phone end-time distribution exceeded a threshold (A) in FIG. 17(d). (A) is determined individually for each end-time distribution. Preferably, (A) is a function of the sum of the end-time distribution values for a subject phone. The interval between times a and b thus represents the time during which the start-time distribution for the phone UH is set. (See FIG. 17(e).) The interval between times c and d in FIG. 17(e) corresponds to the times between which the end-time distribution for the phone DH exceeds the threshold (A) and between which the start-time distribution of the next phone is set. The values of the start-time distribution are obtained by normalizing the end-time distribution by, for example, dividing each end-time value by the sum of the end-time values which exceed the threshold (A).

The basic fast match phone machine 3000 has been implemented in a Floating Point Systems Inc. 190L with an APAL program. Other hardware and software may also be used to develop a specific form of the matching procedure by following the teachings set forth herein.

E. Alternative Fast Match

The basic fast match employed alone or, preferably, in conjunction with the detailed match and/or a language model greatly reduces computation requirements. To further reduce computational requirements, the present teachings further simplifies the detailed match by defining a uniform label length distribution between two lengths—a minimum length $L_{min}$ and a maximum length $L_{max}$. In the basic fast match, the probabilities of a phone generating labels of a given length—namely $l_0$, $l_1$, $l_2$, etc.—typically have differing values. According to the alternative fast match, the probability for each length of labels is replaced by a single uniform value.

Preferably, the minimum length is equal to the smallest length having a nonzero probability in the original length distribution, although other lengths may be selected if desired. The selection of the maximum length is more arbitrary than the selection of the minimum length, but is significant in that the probability of lengths less than the minimum and greater than the maximum are set as zero. By defining the length probability to exist between only the minimum length and the maximum length, a uniform pseudo-distribution can be set forth. In one approach, the uniform probability can be set as the average probability over the pseudo-distribution. Alternatively, the uniform probability can be set as the maximum of the length probabilities that are replaced by the uniform value.

The effect of characterizing all the label length probabilities as equal is readily observed with reference to the equations set forth above for the end-time distribution in the basic fast match. Specifically, the length probabilities can be factored out as a constant.

With $L_{min}$ being set at zero and all length probabilities being replaced by a single constant value, the end-time distribution can be characterized as:

$$\theta_m = \Phi_m/l = q_m + \theta_{m-1} p_m$$

where "l" is the single uniform replacement value and where the value for $p_m$ corresponds preferably to the replacement value for a given label being generated in the given phone at time m.

For the above equation for $\theta_m$, the match value is defined as:

$$\text{match value} = \log_{10}(\theta_0 + \theta_1 + \cdots + \theta_m) + \log_{10}(l)$$

In comparing the basic fast match and the alternative fast match, it has been found that the number of required additions and multiplications are greatly reduced by employing the alternative fast match phone machines. With $L_{min}=0$, it has been found that the basic fast match requires forty multiplications and twenty additions in that the length probabilities must be considered. With the alternative fast match, $\theta_m$ is determined recursively and requires one multiplication and one addition for each successive $\theta_m$.

Figure 19:
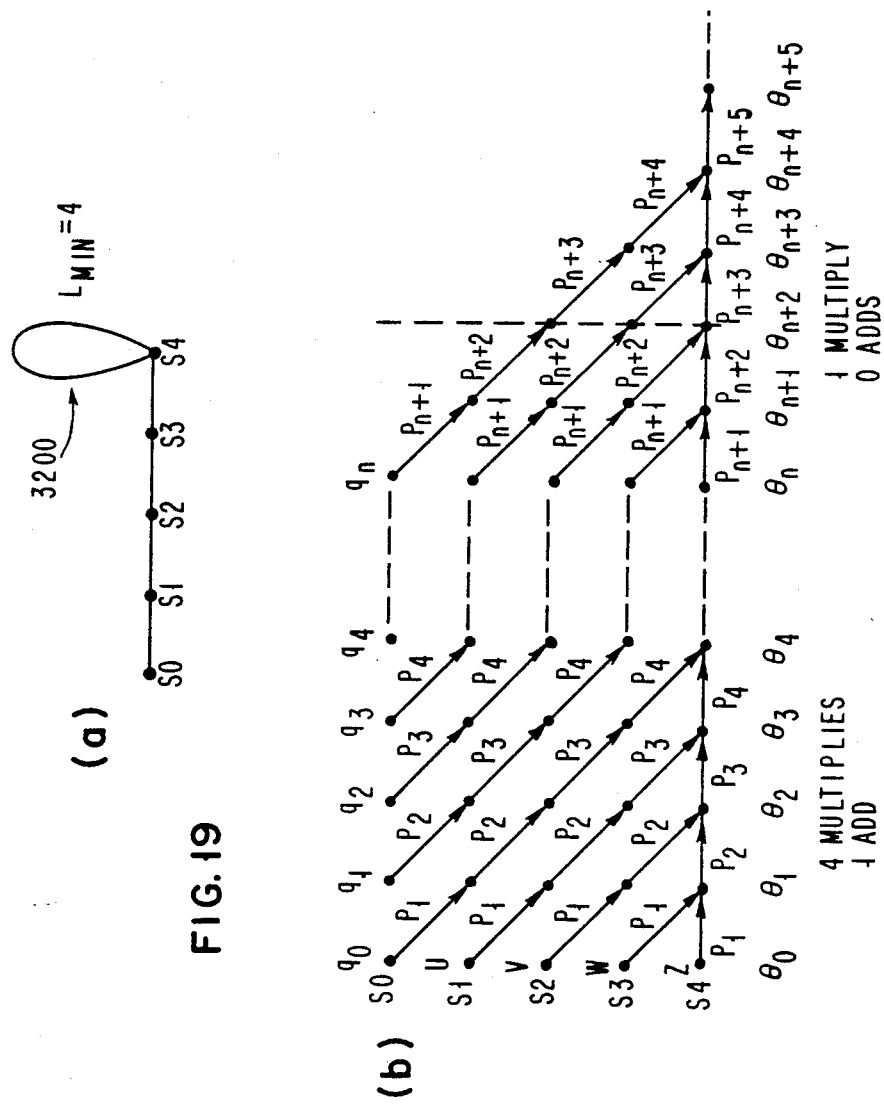
FIG. 19 (a) is a phone machine corresponding to a minimum length four and FIG. 19 (b) is a time diagram corresponding thereto.

To further illustrate how the alternative fast match simplifies computations, FIG. 18 and FIG. 19 are provided. In FIG. 18(a), a phone machine embodiment 3100 corresponding to a minimum length $L_{min}=0$ is depicted. The maximum length is assumed to be infinite so that the length distribution may be characterized as uniform.

In FIG. 18(b), the trellis diagram resulting from the phone machine 3100 is shown. Assuming that start times after $q_n$ are outside the start-time distribution, all determinations of each successive $\theta_m$ with m<n require one addition and one multiplication. For determinations of end times thereafter, there is only one required multiplication and no additions.

In FIG. 19, $L_{min}=4$. FIG. 19(a) illustrates a specific embodiment of a phone machine 3200 therefor and FIG. 19(b) shows a corresponding trellis diagram. Because $L_{min}=4$, the trellis diagram of FIG. 19(b) has a zero probability along the paths marked u, v, w, and z. For those end times which extend between $\theta_4$ and $\theta_n$, it is noted that four multiplications and one addition is required. For end times greater than n+4, one multiplication and no additions are required. This embodiment has been implemented in APAL code on a FPS 190L.

It should be noted that additional states may be added to the FIG. 18 or FIG. 19 embodiments as desired. For example, any number of states with null transitions may be included without altering the value of $L_{min}$.

F. Matching Based On First J Labels

As a further refinement to the basic fast match and alternative fast match, it is contemplated that only the first J labels of a string which enters a phone machine be considered in the match. Assuming that labels are produced by the acoustic processor of an acoustic channel at the rate of one per centisecond, a reasonable value for J is one hundred. In other words, labels corresponding to on the order of one second of speech will be provided to determine a match between a phone and the labels entering the phone machine. By limiting the number of labels examined, two advantages are realized. First, decoding delay is reduced and, second, problems in comparing the scores of short words with long words are substantially avoided. The length of J can, of course, be varied as desired.

The effect of limiting the number of labels examined can be noted with reference to the trellis diagram of FIG. 19(b). Without the present refinement, the fast match score is the sum of the probabilities of $\theta_m$'s along the bottom row of the diagram. That is, the probability of being at state $S_4$ at each time starting at $t=t_0$ (for $L_{min}=0$) or $t=t_4$ (for $L_{min}=4$) is determined as a $\theta_m$ and all $\theta_m$'s are then totalled. For $L_{min}=4$, there is no probability of being in state $S_4$ at any time before $t_4$. With the refinement, the summing of $\theta_m$'s terminates at time J. In FIG. 19(b), time J corresponds to time $t_{n+2}$.

Terminating the examination of J labels over J time intervals can result in the following two probability summations in determining a match score. First, as described hereinbefore, there is a row calculation along the bottom row of the trellis diagram but only up to the time J-1. The probabilities of being in state $S_4$ at each time up to time J-1 are summed to form a row score.

Second, there is a column score which corresponds to the sum of probabilities that the phone is at each respective state $S_0$ through $S_4$ at time J. That is, the column score is:

column score $= \Sigma_{f=0}^{4} Pr(S_f, J)$

The match score for a phone is obtained by summing the row score and column score and then taking the logarithm of that sum. To continue the fast match for the next phone, the values along the bottom row—preferably including time J—are used to derive the next phone start-time distribution.

After determining a match score for each of b consecutive phones, the total for all phones is, as before noted, the sum of the match scores for all the phones.

In examining the manner in which the end-time probabilities are generated in the basic fast match and alternative fast match embodiments set forth above, it is noted that the determination of column scores does not conform readily to the fast match computations. To better adapt the refinement of limiting the number of labels examined to the fast match and alternative match, the present matching technique provides that the column score be replaced by an additional row score. That is, an additional row score is determined for the phone being at state $S_4$ (in FIG. 19(b)) between times J and J+K where K is the maximum number of states in any phone machine. Hence, if any phone machine has ten states, the present refinement adds ten end times along the bottom row of the trellis for each of which a probability is determined. All the probabilities along the bottom row up to and including the probability at time J+K are added to produce a match score for the given phone. As before, consecutive phone match values are summed to provide a word match score.

This embodiment has been implemented in APAL code on a FPS 190L; however as with other portions of the system may be implemented with other codes on other hardware.

G. Phone Tree Structure and Fast Match Embodiments

By employing the basic fast match or alternative fast match—with or without the maximum label limitation—the computational time required in determining phone match values is tremendously reduced. In addition, the computational savings remain high even when the detailed match is performed on the words in the fast match derived list.

Figure 20:
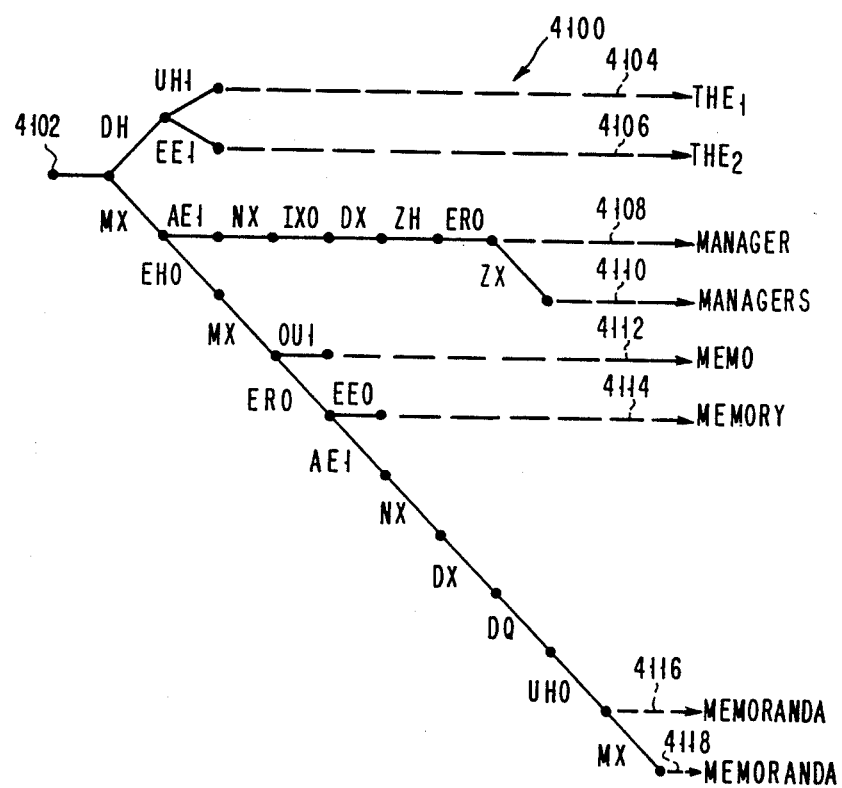
FIG. 20 is a diagram illustrating a tree structure of phones which permit processing of multiple words simultaneously.

The phone match values, once determined, are compared along the branches of a tree structure 4100 as shown in FIG. 20 to determine which paths of phones are most probable. In FIG. 20, the phone match values for DH and UHI (emanating from point 4102 to branch 4104) should sum to a much higher value for the spoken word "the" than the various sequences of phones branching from the phone MX. In this regard, it should be observed that the phone match value of the first MX phone is computed only once and is then used for each baseform extending therefrom. (See branches 4104 and 4106.) In addition, when the total score calculated along a first sequence of branches is found to be much lower than a threshold value or much lower then the total score for other sequences of branches, all baseforms extending from the first sequence may be simultaneously eliminated as candidate words. For example, baseforms associated with branches 4108 through 4118 are simultaneously discarded when it is determined that MX is not a likely path.

With the fast match embodiments and the tree structure, an ordered list of candidate words is generated with great computational savings.

With regard to storage requirements, it is noted that the tree structure of phones, the statistics for the phones, and tail probabilities are to be stored. With regard to the tree structure, there are 25000 arcs and four datawords characterizing each arc. The first dataword represents an index to successor arcs or phones. The second dataword indicates the number of successor phones along the branch. The third dataword indicates at which node in the tree the arc is located. And the fourth dataword indicates the current phone. Hence, for the tree structure, 25000×4 storage spaces are required. In the fast match, there are 100 distinct phones and 200 distinct fenemes. In that a feneme has a single probability of being produced anywhere in a phone, storage for 100×200 statistical probabilities is required. Finally, for the tail probabilities, 200× 200 storage spaces are required. 100K integer and 60K floating point storage is sufficient for the fast match.

H. Language Model

As noted previously, a language model which stores in formation—such as tri-grams—relating to words in context may be included to enhance the probability of a correct word selection. Language models have been reported in the literature.

The language model 1010, preferably, has a unique character. Specifically, a modified tri-gram method is used. In accordance with this method, a sample text is examined to determine the likelihood of each ordered triplet of words, ordered pair of words, or single words in the vocabulary. A list of the most likely triplets of words and a list of the most likely pairs of words are formed. Moreover, the likelihood of a triplet not being in the triplet list and the likelihood of a pair not being in the pair list are respectively.

In accordance with the language model, when a subject word follows two words, a determination is made as to whether the subject word and the two preceding words are on the triplet list. If so, the stored probability assigned to the triplet is indicated. If the subject word and its two predecessors are not on the triplet list, a determination is made as to whether the subject word and its adjacent predecessor are on the pair list. If so, the probability of the pair is multiplied by the probability of a triplet not being o the triplet list, the product then being assigned to the subject word. If the subject word and its predecessor(s) are not on the triplet list or pair list, the probability of the subject word alone is multiplied by the likelihood of a triplet not being on the triplet list and by the probability of a pair not being on the pair list. The product is then assigned to the subject word.

Figure 21:
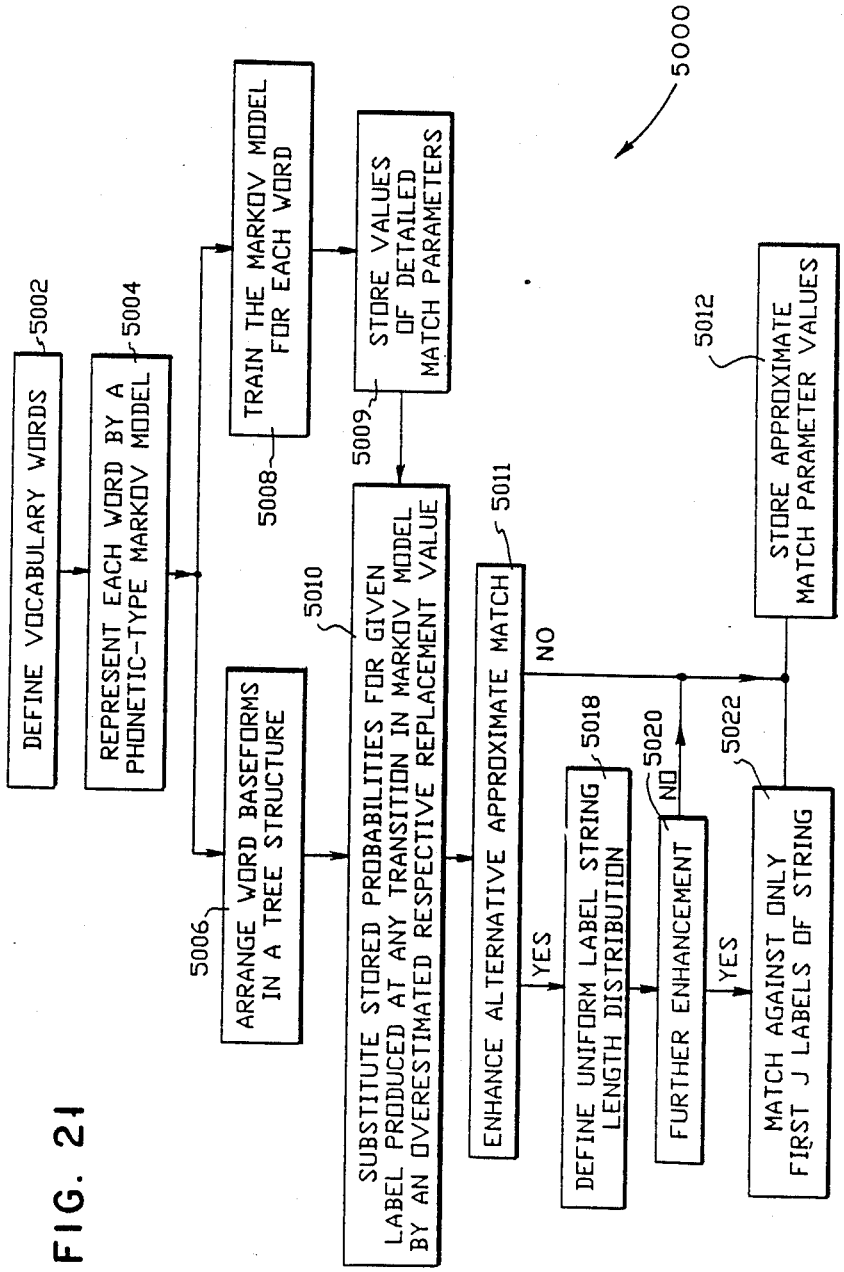
FIG. 21 is a flowchart representing steps performed in forming trained word baseforms.

Referring to FIG. 21, a flowchart 5000 illustrating the training of phone machines employed in acoustic matching is shown. At step 5002, a vocabulary of words—typically on the order of 5000 words—is defined. Each word is then represented by a sequence of phone machines (step 5004). The phone machines have been, by way of example, been shown as phonetic-type phone machines but may, alternatively, comprise a sequence of fenemic phones. Representing words by a sequence of phonetic-type phone machines or by a sequence of fenemic phone machines is discussed hereinbelow. A phone machine sequence for a word is referred to as a word baseform.

In step 5006, the word baseforms are arranged in the tree structure described hereinabove. The statistics for each phone machine in each word baseform are determined by training (step 5008) according to the well-known forward-backward algorithm set forth in the article "Continuous Speech Recognition by Statistical Methods" by F. Jelinek.

At step 5009, values to be substituted for actual parameter values or statistics used in the detailed match are determined. For example, the values to be substituted for the actual label output probabilities are determined. In step 5010, the determined values replace the stored actual probabilities so that the phones in each word baseform include the approximate substitute values. All approximations relating to the basic fast match are performed in step 5010.

A decision is then made as to whether the acoustic matching is to be enhanced (step 5011). If not, the values determined for the basic approximate match are set for use and other estimations relating to other approximations are not set (step 5012). If enhancement is desired, step 5018 is followed. A uniform string length distribution is defined (step 5018) and a decision is made as to whether further enhancement is desired (step 5020). If not, label output probability values and string length probability values are approximated and set for use in the acoustic matching. If further enhancement is desired, acoustic matching is limited to the first J labels in the generated string (step 5022). Whether or not one of the enhanced embodiments is selected, the parameter values determined are set in step 5012, whereupon each phone machine in each word baseform has been trained with the desired approximations that enable the fast approximate matching.

J. Stack Decoder

A preferred stack decoder used in the speech recognition system of FIG. 1 has been invented by L. Bahl, F. Jelinek, and R. L. Mercer of the IBM Speech Recognition Group. The preferred stack decoder is now described.

In FIG. 4 and FIG. 5, a plurality of successive labels $y_1 y_2$—are shown generated at successive "label intervals", or "label positions".

Also shown in FIG. 5 are a plurality of some generated word paths, namely path A, path B, and path C. In the context of FIG. 4, path A could correspond to the entry "to be or", path B to the entry "two b", and path C to the entry "too". For a subject word path, there is a label (or equivalently a label interval) at which the subject word path has the highest probability of having ended—such label being referred to as a "boundary label".

For a word path W representing a sequence of words, a most likely end time—represented in the label string as a "boundary label" between two words—can be found by known methods such as that described in an article entitled "Faster Acoustic Match Computation" (by L. R. Bahl, F. Jelinek, and R. L. Mercer) in the *IBM Technical Disclosure Bulletin* volume 23, number 4, September 1980. Briefly, the article discusses methodology for addressing two similar concerns: (a) how much of a label string Y is accounted for by a word (or word sequence) and (b) at which label interval does a partial sentence—corresponding to a part of the label string—end.

For any given word path, there is a "likelihood value" associated with each label or label interval, including the first label of the label string through to the boundary label. Taken together, all of the likelihood values for a given word path represent a "likelihood vector" for the given word path. Accordingly, for each word path there is a corresponding likelihood vector. Likelihood values $L_t$ are illustrated in FIG. 5.

A "likelihood envelope" $\Lambda_t$ at a label interval t for a collection of word paths $W^1, W^2, \ldots, W^s$ is defined mathematically as:

$$\Lambda_t = \max(L_t(W^1), \ldots, L_t(W^s))$$

That is, for each label interval, the likelihood envelope includes the highest likelihood value associated with any word path in the collection. A likelihood envelope 1040 is illustrated in FIG. 5.

A word path is considered "complete" if it corresponds to a complete sentence. A complete path is preferably identified by a speaker entering an input, e.g. pressing a button, when he reaches the end of a sentence. The entered input is synchronized with a label interval to mark a sentence end. A complete word path cannot be extended by appending any words thereto. A "partial" word path corresponds to an incomplete sentence and can be extended.

Partial paths are classified as "live" or "dead". A word path is "dead" if it has already been extended and "live" if it has not. With this classification, a path which has already been extended to form one or more longer extended word paths is not reconsidered for extension at a subsequent time.

Each word path is also characterizable as "good" or "bad" relative to the likelihood envelope. The word path is good if, at the label corresponding to the boundary label thereof, the word path has a likelihood value which is within $\Delta$ of the maximum likelihood envelope. Otherwise the word path is marked as "bad". Preferably, but not necessarily, $\Delta$ is a fixed value by which each value of the maximum likelihood envelope is reduced to serve as a good/bad threshold level.

For each label interval there is a stack element. Each live word path is assigned to the stack element corresponding to the label interval that corresponds to the boundary label of such a live path. A stack element may have zero, one, or more word path entries—the entries being listed in order of likelihood value.

The steps performed by the stack decoder 1002 of FIG. 1 are now discussed.

Forming the likelihood envelope and determining which word paths are "good" are interrelated as suggested by the sample flowchart of FIG. 6.

In the flowchart of FIG. 6, a null path is first entered into the first stack(0) in step 5050. A stack(complete) element is provided which contains complete paths, if any, which have been previously determined. Each complete path in the stack(complete) element has a likelihood vector associated therewith. If there are complete paths determined in a step 5052, the likelihood vector of the complete path having the highest likelihood at the boundary label thereof initially defines the maximum likelihood envelope (step 1054). If there is no complete path in the stack(complete) element (step 1052), the maximum likelihood envelope is initialized as $-\infty$ at each label interval (step 1056). Moreover, if complete paths are not specified, the maximum likelihood envelope may be initialized at $-\infty$. Initializing the envelope is depicted by steps 5054 and 5056.

After the maximum likelihood envelope is initialized, it is reduced by a predefined amount $\Delta$ to form a $\Delta$-good region above the reduced likelihoods and a Δ-bad region below the reduced likelihoods. The value of Δ controls the breadth of the search. The larger Δ is, the larger the number of word paths that are considered for possible extension. When log 10 is used for determining $L_t$, a value of 2.0 for Δ provides satisfactory results. The value of Δ is preferably, but not necessarily, uniform along the length of label intervals.

If a word path has a likelihood at the boundary label thereof which is in the Δ-good region, the word path is marked "good". Otherwise, the word path is marked "bad".

As shown in FIG. 6, a loop for up-dating the likelihood envelope and for marking word paths as "good" (for possible extension) or "bad" starts with the finding of the longest unmarked word path (step 5058). If more than one unmarked word path is in the stack corresponding to the longest word path length, the word path having the highest likelihood at the boundary label thereof is selected. If a word path is found, it is marked as "good" if the likelihood at the boundary label thereof lies within the Δ-good region or "bad" otherwise (step 5060). If the word path is marked "bad", another unmarked live path is found and marked (step 5062). If the word path is marked "good", the likelihood envelope is up-dated to include the likelihood values of the path marked "good". That is, for each label interval, an up-dated likelihood value is determined as the greater likelihood value between (a) the present likelihood value in the likelihood envelope and (b) the likelihood value associated with word path marked "good". This is illustrated by steps 5064 and 5066. After the envelope is up-dated, a longest best unmarked live word path is again found (step 5058).

The loop is then repeated until no unmarked word paths remain. At that time, the shortest word path marked "good" is selected. If there is more than one word "good" path having a shortest length, the one having the highest likelihood at the boundary label thereof is selected (step 5070). The selected shortest path is then subjected to extension. That is, at least one likely follower word is determined as indicated above by preferably performing the fast match, language model, detailed match, and language model procedure. For each likely follower word, an extended word path is formed. Specifically, an extended word path is formed by appending a likely follower word on the end of the selected shortest word path.

After the selected shortest word path is formed into extended word paths, the selected word path is removed from the stack in which it was an entry and each extended word path is entered into the appropriate stack therefor. In particular, an extended word path becomes an entry into the stack corresponding to the boundary label of the extended word path step 5072.

Figure 22:
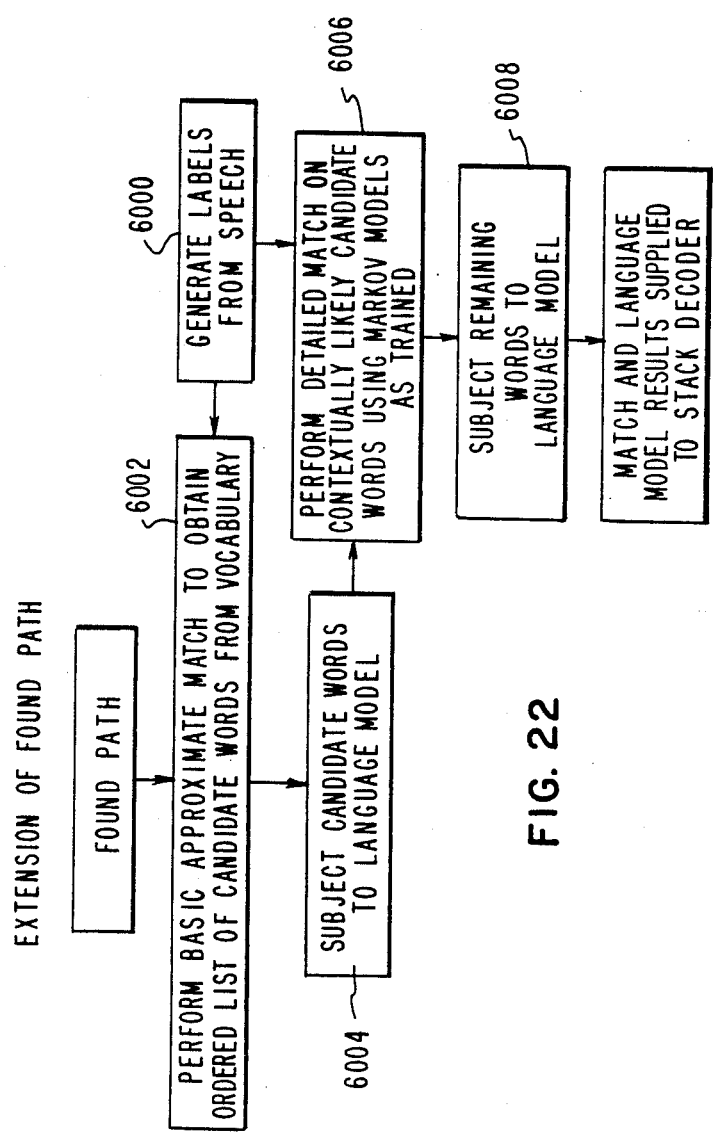
FIG. 22 is a flowchart representing steps performed in extending a word path.

With regard to step 5072, the action of extending the chosen path is discussed with reference to the flowchart of FIG. 22. After the path is found in step 5070, the following procedure is performed whereby a word path or paths are extended based on words derived from an appropriate acoustic match.

At step 6000, the acoustic processor 1004 (of FIG. 1) generates a string of labels as described hereinabove. The string of labels is provided as input to enable step 6002 to be performed. In step 6002 the basic or one of the enhanced approximate matching procedures is performed to obtain an ordered list of candidate words according to the teachings outlined hereinabove.

Thereafter, a language model (as described hereinabove) is applied in step 6004 as described hereinabove. The subject words remaining after the language model is applied are entered together with the generated labels in a detailed match processor which performs step 6006. The detailed match results in a list of remaining candidate words which are preferably subjected to the language model in step 6008. The likely words—as determined by the approximate match, detailed match, and language model are used for extension of the path found in step 5070 of FIG. 6. Each of the likely words determined at step 6008 (FIG. 22) are separately appended to the found word path so that a plurality of extended word paths may be formed.

Referring again to FIG. 6, after the extended paths are formed and the stacks are re-formed, the process repeats by returning to step 5052.

Each iteration thus consists of selecting the shortest best "good" word path and extending it. A word path marked "bad" on one iteration may become "good" on a later iteration. The characterization of a live word path as "good" or "bad" is thus made independently on each iteration. In practice, the likelihood envelope does not change greatly from one iteration to the next and the computation to decide whether a word path is "good" or "bad" is done efficiently. Moreover, normalization is not required.

When complete sentences are identified, step 5074 is preferably included. That is, when no live word paths remain unmarked and there are no "good" word paths to be extended, decoding is finished. The complete word path having the highest likelihood at the respective boundary label thereof is identified as the most likely word sequence for the input label string.

In the case of continuous speech where sentence endings are not identified, path extension proceeds continually or for a predefined number of words as preferred by the system user.

K. Constructing Phonetic Baseforms

One type of Markov model phone machine which can be used in forming baseforms is based on phonetics. That is, each phone machine corresponds to a given phonetic sound.

For a given word, there is a sequence of phonetic sounds each having a respective phone machine corresponding thereto. Each phone machine includes a number of states and transitions therebetween, some of which can produce a feneme output and some (referred to as null transitions) which cannot. Statistics relating to each phone machine—as noted hereinabove—include (a) the probability of a given transition occurring and (b) the likelihood of a particular feneme being produced at a given transition. Preferably, at each non-null transition there is some probability associated with each feneme. In a feneme alphabet shown in Table 1, there are about 200 fenemes. A phone machine used in forming phonetic baseforms is illustrated in FIG. 3. A sequence of such phone machines is provided for each word. The statistics, or probabilities, are entered into the phone machines during a training phase in which known words are uttered. Transition probabilities and feneme probabilities in the various phonetic phone machines are determined during training by noting the feneme string(s) generated when a known phonetic sound is uttered at least once and by applying the well-known forward-backward algorithm.

A sample of statistics for one phone identified as phone DH are set forth in Table 2. As an approximation, the label output probability distribution for transitions tr1, tr2, and tr8 of the phone machine of FIG. 3 are represented by a single distribution; transitions tr3, tr4, tr5, and tr9 are represented by a single distribution; and transitions tr6, tr7, and tr10 are represented by a single distribution. This is shown in Table 2 by the assignment of arcs (i.e. transitions) to the respective columns 4, 5, or 6. Table 2 shows the probability of each transition and the probability of a label (i.e. feneme) being generated in the beginning, middle, or end, respectively, of the phone DH. For the DH phone, for example, the probability of the transition from state $S_1$ to state $S_2$ is counted as 0.07243. The probability of transition from state $S_1$ to state $S_4$ is 0.92757. (In that these are the only two possible transitions from the initial state, their sum equals unity.) As to label output probabilities, the DH phone has a 0.091 probability of producing the feneme AE13 (see Table 1) at the end portion of the phone, i.e. column 6 of Table 2. Also in Table 2 there is a count associated with each node (or state). The node count is indicative of the number of times during the training that the phone was in the corresponding state. Statistics as in Table 2 are found for each phoneme machine.

The arranging of phonetic phone machines into a word baseform sequence is typically performed by a phonetician and is normally not done automatically.

The phonetic baseform has been used in the detailed match and in the fast approximate acoustic match with success. Because the phonetic baseform relies on the judgment of a phonetician and is not automatic, phonetic baseforms are sometimes inaccurate.

(II) Defining the Set of Phone Machines to Include Onset Phone Machines and Trailing Phone Machines The phone machines used in constructing the baseform discussed in section (I)(K) are selected from a set of phone machines. In prior generations of the speech recognition system outlined hereinabove, each sound class (or more specifically each phonetic element) was associated with only a single phone machine.

Each phone machine as described hereinabove includes transitions and probabilities relating thereto, and label output probabilities associated with the transitions. The phone machine thereby contains statistics indicating the likelihood of producing some given label at some given transition of the phone machine if the phonetic sound corresponding thereto is uttered. The statistics are derived in a training period during which known sounds are spoken into the acoustic processor 1004 (of FIG. 1) and a known forward-backward algorithm is applied. To a great extent, the statistics derived during training are determined by labels generated by the acoustic processor 1004 when the known sounds are spoken. The labels generated by the acoustic processor 1004, however, are determined by energy-related characteristics corresponding to the spoken input. Referring to the time waveform of FIG. 23 and the spectrogram of FIG. 24 for the word "WILL", the energy characteristics during build-up of the "w" sound from silence are notably different from the energy characteristics of the "w" sound which follows the energy build-up.

Prior to the present invention, no distinction was made whether the sound class or phonetic element occurred at the beginning of a word following a period of silence, at the middle of a word, or at the end of a word. In accordance with the present invention, this distinction is recognized.

Figure 23:
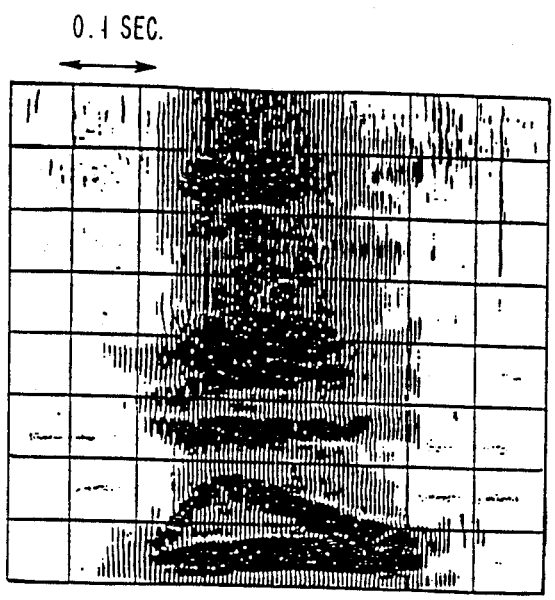
FIG. 23 is a spectrogram of the word WILL spoken in isolation.
Figure 24:
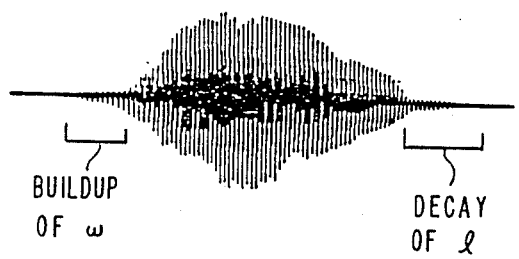
FIG. 24 is a time diagram of the word WILL spoken in isolation.

The first 0.1 second of the word "WILL" as illustrated in FIG. 23 and FIG. 24 represents the build-up for the "w" sound with the portion of the waveform immediately thereafter corresponding to the "w" sound not appreciably affected by silence.

Treating the energy build-up and the portion thereafter collectively as a single phone for the "w" sound—as in earlier system generations" results in system inaccuracy. A single phone machine for the "w" sound, that is, incorporated in its statistics instances when the "w" sound occurred at the beginning of a word, at the end of a word, and within a word. The single phone machine therefore had statistics that were "contaminated" by energy build-up and energy decay.

In accordance with the present invention, a given sound—such as the "w" sound—may have associated therewith a plurality of phone machines. The "w" sound, for example, has a common phone machine which embodies statistics of the "w" sound when uttered uninfluenced by silence. The common phone machine includes statistics generated by utterances of the "w" sound not adjacent to a period of silence. The common phone is thus not contaminated by energy characteristics relating energy build-up or decay. In addition, the "w" sound also has an onset phone machine which reflects statistics related to utterance of the "w" sound in transition from a period of silence. Also in addition, the "w" sound has a trailing phone machine which reflects statistics related to utterance of the "w" sound immediately prior to a period of silence.

The onset phone machine for the "w" sound is referred to as ONSETLX, or ONLX. The trailing phone for the "w" sound is referred to as TRAILLX, or TRLX. The common phone machine is referred to as WX. Each phone machine is defined separately, each having its own transition probabilities and label probabilities. The different statistics for the three phone machines associated with the "w" sound are shown in Tables 3, 4, and 5.

Figure 25:
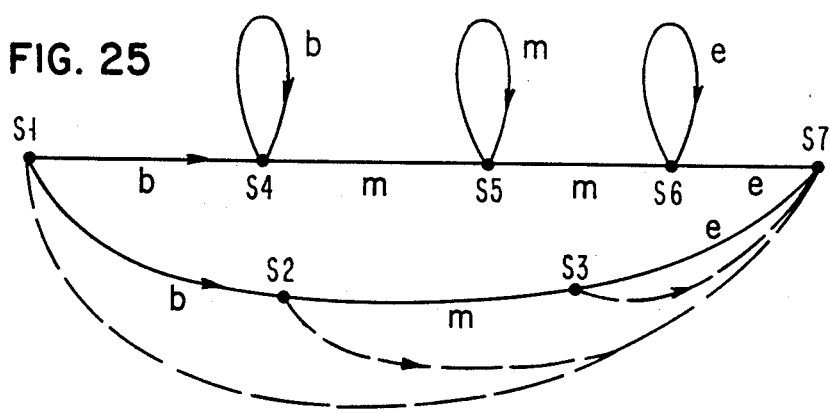
FIG. 25 is a drawing of a phonetic phone machine divided into three statistical sections: the beginning, middle, and end.

In Table 3, phone machine ONLX has statistics organized in the same manner as the statistics in Table 2. The probabilities of producing various labels at the beginning, middle, and end sections of the phone machine are set forth in the three columns. Transition probabilities from one state to another are also indicated. FIG. 25 illustrates how the transitions are grouped for a phone machine (like the phone machine of FIG. 3) to provide the three sections.

It should be realized that the statistics in Table 3 are derived during a training period and apply to a particular speaker.

In trailing, a sample known text is spoken by the speaker. From the known text, the sequence of phones corresponding to the text are determined. When a known word is uttered, a string of labels (or fenemes) is generated. The labels are aligned against the phone machines in the sequence in a conventional manner, as by Viterbi alignment. The correspondence between generated labels and phones in the known text serves as the basis for determining the various probabilities found in each phone machine. For example, the "w" sound preceded by silence may occur a number of times at "known" intervals during the training period. The number of times a particular label—e.g. WX7—is generated when the "w" sound is preceded by silence is processed to provide a probability such as that shown in Table 3. Specifically, the onset phone machine for the sound "w" has a probability of 0.036 of producing the WX7 label in the middle of the phone machine and a probability of 0.197 of producing the label WX7 in the end of the phone machine. It is also noted in Table 3 that the onset phone ONLX has a transition probability between states 1 and 4 of 0.67274 while that between states 1 and 2 is 0.32370.

The significance of the invention becomes particularly noticeable when Tables 3, 4, and 5 are compared. Tables 4 and 5, it is observed, do not include the label output WX7—discussed with reference to Table 3—as a major label output. Moreover, Table 5 lists a 100% probability of following the transition from state 1 to 4, leaving no probability of following the parallel transition from state 1 to state 2. This is notably different from the statistics noted above in Table 3.

The significant differences in the statistics set forth in Tables 3, 4, and 5 suggest the likely inaccuracy resulting from lumping all occurrences of the sound "w" regardless of position in a word—into the statistics of a single phone machine.

In forming word baseforms, each of which comprises a sequence of phones, the phones are selected from a predefined set of phones. In previous generations where the single phone machine strategy was used, there were on the order of seventy phones (as mentioned previously). In accordance with the invention, the set of phones is augmented by preferably an additional 26 phones, including 14 onset phones and 12 trailing phones. Table 6 identifies and lists these additional phones. Referring to Table 6, it is observed that each sound class (or more specifically phonetic element) does not have its own onset phone machine and trailing phone machine. Although such an arrangement is within the scope of the present invention, an inventory of 210 phone machines—three for each sound class—is considered too large if a large amount of training data is not available. Accordingly, certain sound classes which do not display great variance in statistics whether adjacent to silence or not have just a common phone machine corresponding thereto. Such sound classes include PX, TX, and KX—which are referred to as unvoiced stops. Unvoiced stops are not influenced by position within a word and therefore are represented by a single phone.

In addition, it has been noted that certain groups of sound classes have very similar statistics relating to energy build-up. For each such group, one onset phone machine is provided. This is illustrated in Table 6 where eight sound classes (or more specifically phonetic elements) are associated with the onset phone machine ONSETAA, or ONAA. Similarly, certain groups of sound classes have very similar statistics relating to energy decay. For each such group, one trailing phone machine is provided. For example, seven sound classes are associated with the trailing phone machine TRAILAA, or TRAA. With the grouping, there are less phone machines and less training data is required to generate acoustic statistics therefor. The grouping has not resulted in any significant compromise in performance relative to a system employing 210 phone machines.

Table 6 also indicates the standard phonetic symbols which correspond to the identifiers used in the present invention. It should be noted, at this point, that the present invention preferably tracks some of the conventional phonetic elements (identified by the illustrated symbols), but that the invention also contemplates other types of sound classes beyond those of the International Phonetic Alphabet.

The phones in Table 6 with a "0" suffix indicate an unstressed vowel The phones in Table 6 with a "1" suffix indicate a stressed vowel.

Having identified the additional phones in Table 6, reference is now made to Table 7. Table 7 is a list identifying all of the phones for which phone machines are defined in accordance with a preferred embodiment of the invention.

From the set of phones suggested by Table 7, baseforms of words are constructed. Considering again the word "WILL", it is noted that the baseform is defined as the sequence of phones—or equivalently phone machines—illustrated in FIG. 26. The phonetic spelling of the word "WILL" is set forth in FIG. 27. The phone machine ONLX represents the onset phone machine for the "w" sound. (The ONLX phone machine, it is noted, would also be the first phone machine of baseforms starting with the "l" or "hw" phonetic elements.)

Following the ONLX phone machine for the word "WILL" is the phone machine WX corresponding to the common phone machine for the "w" sound. Thereafter, the IX1 phone machine, the LX common phone machine, and the TRLX phone machine follow.

Each word in the vocabulary is similarly represented by a baseform—such as that illustrated for the word "WILL" in FIG. 26. In forming each word, the phones which comprise the subject word are determined and then the phone machines corresponding to the phones are concatenated.

In computer inventory, each word is represented by the sequence of phone machines corresponding thereto wherein, for each phone machine, the statistics therefor are stored. To reduce storage requirements, each phone machine may be represented by a corresponding identifier so that wordbaseforms are defined as a sequence of phone machine identifiers. For example, the baseform for the word "WILL" would correspond to the sequence of identifiers: 43-27-81-12-56. Identifier 43 corresponds to phone machine ONLX, identifier 27 refers to phone machine WX, and so on. Each phone machine, after the training period, has statistics like those set forth in Tables 2 through 5 stored in one portion of memory. When a subject word is considered, the statistics for the constituent phone machine identifiers are retrieved.

FIG. 28 and FIG. 29 are examples of two other baseforms, one for the word "BOG" and the other for the word "DOG". Both baseforms start with the onset phone machine ONBX. "DOG" then includes the phone machine sequence DX, AW1, GX, and TRBX. "BOG", after ONBX, includes the phone machines BX, AWI, GX, and TRBX in order. Because of the similar energy build-up for the "B" and "D" sounds, the same onset phone machine is applied. In training the ONBX phone machine, it is preferred that the utterance of any of the sounds (or phonetic elements) represented thereby be incorporated into the generation of statistics. This condition is also preferably applied to the various other onset phone machines and trailing phone machines that correspond to multiple sound classes (or phonetic elements).

Referring to the flowchart of FIG. 30, a set of phone machines is formed of onset phone machines, common phone machines, and trailing phone machines in step 8002. A word is then selected from the vocabulary of words (step 8004). The word is then characterized as a plurality of phonetic elements, or more generally sound classes, in a prescribed order—such as W-I-l for the word "WILL" (step 8006). The first phonetic element in order is considered to determine if there is an onset phone machine corresponding thereto (step 8008). If so, the corresponding onset phone machine is retrieved and the first two phone machines are set as the onset phone machine followed by the common phone machine for the first phonetic element (steps 8010 and 8012). If there is no onset phone machine corresponding to the first phonetic element, the common phone machine therefor represents the start of the baseform (step 8013).

If there is no next phonetic element (step 8014), a determination is made as to whether the first phonetic element has a trailing phone associated therewith at step 8015. If there is no trailing phone, the baseform is defined as the onset phone (machine) followed by the common phone (machine). If there is a trailing phone associated with the first phonetic element, it is appended to the common phone so that the word baseform includes the onset phone machine, common phone machine, and trailing phone machine for the first phonetic element.

If there is a next phonetic element (step 8014), the next phonetic element is examined in step 8017 to determine if it is last in the order. If it is last, a decision is then made as to whether the phonetic element has a trailing phone machine associated therewith (step 8018). If so, the baseform is completed by appending the common phone machine followed by the trailing phone machine corresponding to the last phonetic element (step 8020). If there is no associated trailing phone machine, the common phone machine for the last phonetic element serves as the end of the baseform (step 8022).

If the next phonetic element is not the last, the common phone for the phonetic element is appended to the phone machines previously sequenced (step 8024). Successive phone machines are appended to extend the sequence until the phone machine(s) corresponding to the last phonetic element are appended.

Referring next to FIG. 31, the forming of phone machines according to the invention is set forth. Sound classes are initially defined (step 8100) as, for example, selected phonetic elements from the International Phonetic Alphabet. The collection of sound classes represent the types of sounds that are formed by speech. A plurality of phone machines are formed, each having means for storing statistics relating thereto (step 8102). A given class of sound is then selected in step 8104 from a first set of sound classes, each class of which is to have an onset phone machine assigned thereto. Sound classes that are significantly influenced by energy build-up preferably form the first set. (As noted previously, all sound classes may form the first set if sufficient training data is available.) The given sound class is then assigned an onset phone machine (step 8106). Statistics for the assigned onset phone machine are then derived in step 8108 from utterances at the beginning of a speech segment (e.g. a word)—the utterances being of the sound corresponding to the given sound class or sound having similar energy build-up characteristics.

A common phone machine is then defined for the given sound class (step 8110) and statistics therefor are generated in step 8112. After each sound class that is to have an onset phone machine has been processed as the "given" sound class (step 8114), a "given" sound class is defined for a second set of sound classes which are to have trailing phone machines assigned thereto.

A given sound class from the second set is selected (step 8116) and a trailing phone machine is assigned thereto (step 8118). Statistics for the assigned trailing phone are generated from utterances occurring at the end of a speech segment -utterances of the sound corresponding to the given sound class or sounds having similar energy decay characteristics (step 8120). Thereafter, a common phone machine for the given sound is assigned (step 8122) and, if statistics have not previously been determined, statistics are generated in step 8124. A decision is made as to whether all sound classes which are to have a trailing phone machine assigned thereto have been selected as the "given" phone (step 8126). If so, all phone machines have been formed. If not, a previously unselected sound class is selected as the given sound class, and steps 8118 through 8126 are repeated.

It should be noted that the flowchart in FIG. 31 may be modified in various ways in accordance with the invention. First, if only onset phone machines are sought, steps 8116 through 8126 may be omitted. Similarly, if only trailing phone machines are sought, steps 8104 through 8114 may be omitted. Second, if desired, the first set of sound classes and the second set of sound classes may coincide.

A further step relates to those embodiments in which a single onset phone machine or trailing phone machine is assigned to more than one sound class. In this case, the statistics need be generated only once and are applied to each sound class appropriately.

Preferably, a determination is made initially as to which sound classes should have onset phone machines and trailing phone machines assigned thereto, thereby defining the first set and second set of steps 8104 and 8116 respectively.

In a speech recognition context, the present invention provides apparatus for forming baseforms with the augmented number of phone machines. Apparatus for achieving this is set forth in FIG. 32.

Figure 32:
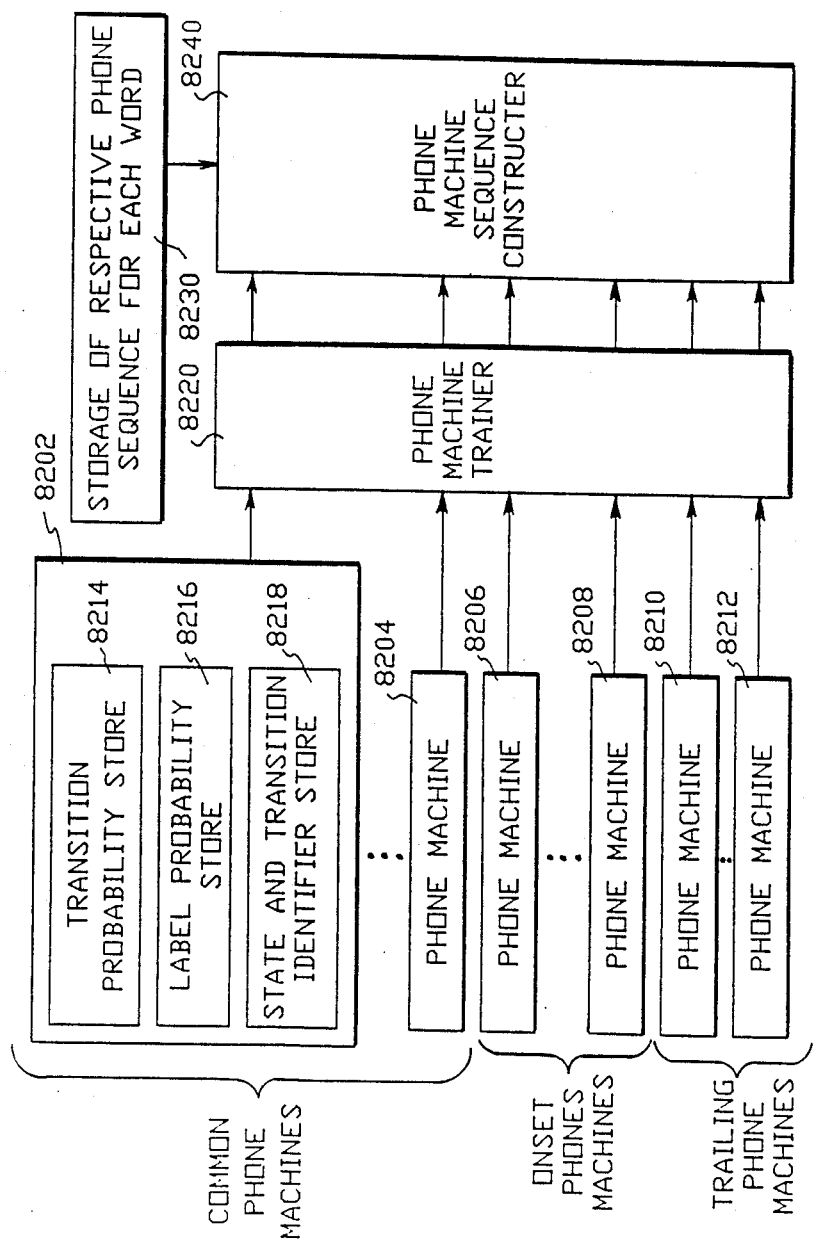
FIG. 32 is a block diagram illustrating apparatus for constructing enhanced word baseforms formed of onset phone machines, common phone machines, and trailing phone machines.

In FIG. 32, a plurality of phone machines 8202 through 8212 are identified. Each phone machine is structured similar to phone machine 8202 in that each includes: (a) a transition probability store 8214, (b) a label probability store 8216, and (c) state and transition identifier storage 8218. A number of the phone machines—such as phone machines 8202 and 8204—are common phone machines. A number of phone machines—such as phone machines 8206 and 8208—are onset phone machines. And a number of phone machines—such as phone machines 8210 and 8212—are trailing phone machines. Each phone machine 8202 through 8212 is filled with statistics into the respective storage thereof by a trainer 8220.

Each word is previously defined as a sequence of phones with the sequence being stored in an element 8230. A baseform constructer 8240 combines the phone sequence information from the store element 8230 with the statistics derived by the trainer 8220 and constructs a sequence of phone machines. The sequence of phone machines for a given word represents the baseform for the word and is used for acoustic matching (which is described in sections (I)(C) through (I)(F) hereinabove). That is, unknown speech to be recognized is uttered, the acoustic processor 1004 (of FIG. 1) generating a string of labels in response. Matching of baseforms—which are formed of phone machines from the enhanced set of phone machines—against the labels in the string is provided by the present invention.

By employing the additional phone machines as taught by the present invention, significant improvements in recognition accuracy and speed have been obtained.

While the invention has been described with reference to preferred embodiments thereof, it will be understood by those skilled in the art that various changes in form and details may be made without departing from the scope of the invention.

In this regard it is noted that the present invention may be employed in an isolated word speech recognition system and also in a continuous speech recognition system. In the isolated word case, there is a pause after each word. There is then often a build-up and decay at the start and end of each word. The present invention applies particularly well to such a system. In the continuous speech case, words run together and there are typically pauses between phrases. Rather than characterizing each word baseform with a build-up and decay portion, the continuous speech case suggests providing the onset phone machines and decay phone machines between phrases. The isolated words and continuous speech phrases are included in the more generic term "speech segment". A speech segment may be viewed as a portion of speech between two periods of silence.

TABLE 1

THE TWO LETTERS ROUGHLY REPRESENT THE SOUND OF THE ELEMENT.
TWO DIGITS ARE ASSOCIATED WITH VOWELS:
　FIRST: STRESS OF SOUND
　SECOND: CURRENT IDENTIFICATION NUMBER
ONE DIGIT ONLY IS ASSOCIATED WITH CONSONANTS:
　SINGLE DIGIT: CURRENT IDENTIFICATION NUMBER

| | | | | | | | | | |
|---|---|---|---|---|---|---|---|---|---|
| 001 | AA11 | 029 | BX2- | 057 | EH02 | 148 | TX5- | 176 | XX11 |
| 002 | AA12 | 030 | BX3- | 058 | EH11 | 149 | TX6- | 177 | XX12 |
| 003 | AA13 | 031 | BX4- | 059 | EH12 | 150 | UH01 | 178 | XX13 |
| 004 | AA14 | 032 | BX5- | 060 | EH13 | 151 | UH02 | 179 | XX14 |
| 005 | AA15 | 033 | BX6- | 061 | EH14 | 152 | UH11 | 180 | XX15 |
| 006 | AE11 | 034 | BX7- | 062 | EH15 | 153 | UH12 | 181 | XX16 |
| 007 | AE12 | 035 | BX8- | 126 | RX1- | 154 | UH13 | 182 | XX17 |
| 008 | AE13 | 036 | BX9- | 127 | SH1- | 155 | UH14 | 183 | XX18 |
| 009 | AE14 | 037 | DH1- | 128 | SH2- | 156 | UU11 | 184 | XX19 |
| 010 | AF15 | 038 | DH2- | 129 | SX1- | 157 | UU12 | 185 | XX2- |
| 011 | AW11 | 039 | DQ1- | 130 | SX2- | 158 | UXG1 | 186 | XX20 |
| 012 | AW12 | 040 | DQ2- | 131 | SX3- | 159 | UXG2 | 187 | XX21 |
| 013 | AW13 | 041 | DQ3- | 132 | SX4- | 160 | UX11 | 188 | XX22 |
| 014 | AX11 | 042 | DQ4- | 133 | SX5- | 161 | UX12 | 189 | XX23 |
| 015 | AX12 | 043 | DX1- | 134 | SX6- | 162 | UX13 | 190 | XX24 |
| 016 | AX13 | 044 | DX2- | 135 | SX7- | 163 | VX1- | 191 | XX3- |
| 017 | AX14 | 045 | EE01 | 136 | TH1- | 164 | VX2- | 192 | XX4- |
| 018 | AX15 | 046 | EE02 | 137 | TH2- | 165 | VX3- | 193 | XX5- |
| 019 | AX16 | 047 | EE11 | 138 | TH3- | 166 | VX4- | 194 | XX6- |
| 020 | AX17 | 048 | EE12 | 139 | TH4- | 167 | WX1- | 195 | XX7- |
| 021 | BQ1- | 049 | EE13 | 140 | TH5- | 168 | WX2- | 196 | XX8- |
| 022 | BQ2- | 050 | EE14 | 141 | TQ1- | 169 | WX3- | 197 | XX9- |
| 023 | BQ3- | 051 | EE15 | 142 | TQ2- | 170 | WX4- | 198 | ZX1- |
| 024 | BQ4- | 052 | EE16 | 143 | TX3- | 171 | WX5- | 199 | ZX2- |
| 025 | BX1- | 053 | EE17 | 144 | TX1- | 172 | WX6- | 200 | ZX3- |
| 026 | BX10 | 054 | EE18 | 145 | TX2- | 173 | WX7- | | |
| 027 | BX11 | 055 | EE19 | 146 | TX3- | 174 | XX1- | | |
| 028 | BX12 | 056 | EH01 | 147 | TX4- | 175 | XX10 | | |

TABLE 2

| PHONE | 3 DH | | 7 NODES. | | 13 ARCS. | | 3 ARC LABELS. | | | | |
|---|---|---|---|---|---|---|---|---|---|---|---|
| NODE | 1 | 2 | 3 | 4 | 5 | 6 | 7 | | | | |
| LABEL | 8 | 9 | 10 | 11 | 12 | 13 | 0 | | | | |
| COUNT | 31.0 | 1.7 | 1.7 | 119.1 | 115.4 | 120.1 | 0.0 | | | | |
| ARC | 1 → 2 | 1 → 4 | 1 → 7 | 2 → 3 | 2 → 7 | 3 → 7 | 3 → 7 | 4 → 4 | 4 → 5 | 5 → 5 | |
| LABEL | 4 | 4 | NULL | 5 | NULL | 6 | NULL | 4 | 5 | 5 | |
| PROB | 0.07243 | 0.92757 | 0.00000 | 0.99259 | 0.00741 | 0.93982 | 0.06018 | 0.75179 | 0.24821 | 0.74389 | |
| ARC | 5 → 6 | 6 → 6 | 6 → 7 | | | | | | | | |
| LABEL | 5 | 6 | 6 | | | | | | | | |
| PROB | 0.25611 | 0.75370 | 0.24630 | | | | | | | | |
| LABEL | 4 | 5 | 6 | | | | | | | | |
| COUNT | 120.8 | 146.4 | 121.6 | | | | | | | | |
| AE13 | | | 0.091 | | | | | | | | |
| BX10 | 0.030 | | | | | | | | | | |
| BX3_ | 0.130 | | | | | | | | | | |
| BX8_ | 0.011 | 0.086 | | | | | | | | | |
| DH1_ | 0.020 | 0.040 | 0.013 | | | | | | | | |
| DQ2 | 0.011 | 0.052 | | | | | | | | | |
| EHOT | 0.010 | 0.014 | 0.167 | | | | | | | | |
| EH02 | | | 0.026 | | | | | | | | |
| EH11 | | | 0.015 | | | | | | | | |
| EH13 | | | 0.012 | | | | | | | | |
| EH14 | | | 0.062 | | | | | | | | |
| ER14 | | | 0.024 | | | | | | | | |
| FX2_ | | 0.045 | | | | | | | | | |
| FX3_ | | 0.148 | | | | | | | | | |
| GX2_ | | 0.013 | | | | | | | | | |

TABLE 2-continued

| | | | |
|---|---|---|---|
| GX5_ | 0.148 | | |
| GX6_ | 0.246 | 0.023 | |
| HX1_ | | 0.011 | |
| IX04 | 0.011 | | 0.020 |
| IX13 | 0.025 | | 0.026 |
| KQ1_ | | 0.014 | 0.024 |
| KX2_ | | 0.013 | |
| MX2_ | 0.029 | 0.043 | 0.012 |
| NX3_ | 0.019 | | |
| NX5_ | 0.049 | | |
| NX6_ | | 0.017 | 0.012 |
| OU14 | | | 0.023 |
| PQ1_ | 0.029 | 0.018 | |
| TH2_ | | 0.020 | |
| TQ3_ | | 0.017 | |
| UHOT | | | 0.020 |
| UH02 | 0.025 | 0.082 | 0.109 |
| UXG2 | | | 0.016 |
| UX12 | | | 0.062 |
| UX13 | | | 0.183 |
| VX1_ | | | 0.016 |
| VX3_ | 0.041 | 0.283 | 0.016 |
| WX2_ | 0.023 | 0.014 | |
| XX23 | 0.072 | | |
| OTHER | 0.073 | 0.047 | 0.048 |

TABLE 3

| PHONE | 43 ONLX | | 7 NODES. | 13 ARCS. | 3 ARC LABELS. | | | | | |
|---|---|---|---|---|---|---|---|---|---|---|
| NODE | 1 | 2 | 3 | 4 | 5 | 6 | 7 | | | |
| LABEL | 242 | 243 | 244 | 245 | 246 | 247 | 0 | | | |
| COUNT | 121.0 | 39.0 | 29.6 | 247.9 | 197.7 | 305.8 | 0.0 | | | |
| ARC | 1 → 2 | 1 → 4 | 1 → 7 | 2 → 3 | 2 → 7 | 3 → 7 | 3 → 7 | 4 → 4 | 4 → 5 | 5 → 5 |
| LABEL | 121 | 121 | NULL | 122 | NULL | 123 | NULL | 121 | 122 | 122 |
| PROB | 0.32370 | 0.67274 | 0.00356 | 0.76233 | 0.23767 | 0.78376 | 0.21624 | 0.66957 | 0.33043 | 0.58670 |
| ARC | 5 → 6 | 6 → 6 | 6 → 7 | | | | | | | |
| LABEL | 122 | 123 | 123 | | | | | | | |
| PROB | 0.41330 | 0.73143 | 0.26857 | | | | | | | |
| LABEL | 121 | 122 | 123 | | | | | | | |
| COUNT | 287.0 | 309.0 | 329.0 | | | | | | | |
| BX1 | | 0.025 | | | | | | | | |
| BX10 | 0.017 | 0.035 | | | | | | | | |
| BX11 | | 0.165 | 0.046 | | | | | | | |
| BX12 | | 0.015 | | | | | | | | |
| BX2_ | | 0.126 | 0.137 | | | | | | | |
| BX3_ | 0.011 | 0.176 | 0.026 | | | | | | | |
| BX4_ | 0.053 | 0.076 | | | | | | | | |
| BX5_ | | 0.011 | | | | | | | | |
| BX6_ | | 0.018 | 0.012 | | | | | | | |
| DQ4_ | | 0.014 | 0.018 | | | | | | | |
| GX3_ | | 0.036 | 0.099 | | | | | | | |
| KX3_ | | 0.010 | | | | | | | | |
| NG2_ | | 0.026 | 0.013 | | | | | | | |
| PX5_ | 0.039 | | | | | | | | | |
| TX2_ | 0.011 | | | | | | | | | |
| TX6_ | 0.018 | | | | | | | | | |
| VX3_ | | | 0.016 | | | | | | | |
| WX2_ | | 0.060 | 0.048 | | | | | | | |
| WX6_ | | | 0.289 | | | | | | | |
| WX7_ | | 0.036 | 0.197 | | | | | | | |
| XX12 | 0.462 | 0.015 | | | | | | | | |
| XX13 | 0.013 | | | | | | | | | |
| XX16 | 0.017 | | | | | | | | | |
| XX17 | 0.033 | | | | | | | | | |
| XX18 | 0.046 | | | | | | | | | |
| XX23 | 0.070 | 0.024 | | | | | | | | |
| XX24 | 0.011 | | | | | | | | | |
| XX3_ | 0.020 | | | | | | | | | |
| XX4_ | 0.018 | | | | | | | | | |
| XX7_ | 0.042 | 0.014 | | | | | | | | |
| OTHER | 0.119 | 0.118 | 0.099 | | | | | | | |

TABLE 4

| PHONE | 27 WX | | 7 NODES. | 13 ARCS. | 3 ARC LABELS. | | | | | |
|---|---|---|---|---|---|---|---|---|---|---|
| NODE | 1 | 2 | 3 | 4 | 5 | 6 | 7 | | | |
| LABEL | 152 | 153 | 154 | 155 | 156 | 157 | 0 | | | |
| COUNT | 119.0 | 3.8 | 3.8 | 396.8 | 404.1 | 376.5 | 0.0 | | | |
| ARC | 1 → 2 | 1 → 4 | 1 → 7 | 2 → 3 | 2 → 7 | 3 → 7 | 3 → 7 | 4 → 4 | 4 → 5 | 5 → 5 |
| LABEL | 76 | 76 | NULL | 77 | NULL | 78 | NULL | 76 | 77 | 77 |

TABLE 4-continued

| | | | | | | | | | |
|---|---|---|---|---|---|---|---|---|---|
| PROB | 0.03525 | 0.96475 | 0.00000 | 1.00000 | 0.00000 | 0.74474 | 0.25526 | 0.70805 | 0.29195 | 0.71324 |
| ARC | 5 → 6 | 6 → 6 | 6 → 7 | | | | | | |
| LABEL | 77 | 78 | 78 | | | | | | |
| PROB | 0.28677 | 0.69247 | 0.30753 | | | | | | |
| LABEL | 76 | 77 | 78 | | | | | | |
| COUNT | 400.6 | 523.1 | 379.2 | | | | | | |
| AW11 | | 0.019 | 0.155 | | | | | | |
| AW12 | 0.013 | | 0.025 | | | | | | |
| AW13 | | 0.125 | 0.122 | | | | | | |
| AX11 | | | 0.043 | | | | | | |
| AX13 | | | 0.027 | | | | | | |
| AX14 | | | 0.010 | | | | | | |
| AX15 | | | 0.062 | | | | | | |
| BX1_ | 0.093 | | | | | | | | |
| BX1T | 0.064 | | | | | | | | |
| BX12 | 0.051 | | | | | | | | |
| BX2_ | 0.055 | | | | | | | | |
| BX6_ | 0.038 | | | | | | | | |
| DQ4_ | 0.023 | 0.010 | | | | | | | |
| GX3_ | 0.256 | 0.014 | | | | | | | |
| IX13 | | | 0.011 | | | | | | |
| LX1_ | | 0.091 | 0.069 | | | | | | |
| LX2_ | | | 0.015 | | | | | | |
| MX2_ | 0.018 | | | | | | | | |
| OU11 | | | 0.018 | | | | | | |
| OU12 | | | 0.015 | | | | | | |
| OU13 | | | 0.031 | | | | | | |
| OU14 | | | 0.031 | | | | | | |
| UH12 | | 0.014 | 0.163 | | | | | | |
| UH14 | | | 0.044 | | | | | | |
| UU11 | | | 0.014 | | | | | | |
| UU12 | | 0.034 | | | | | | | |
| UXG2 | | 0.020 | | | | | | | |
| UX12 | | | 0.069 | | | | | | |
| VX2_ | 0.143 | | | | | | | | |
| VX4_ | 0.022 | | | | | | | | |
| WX1_ | 0.011 | 0.109 | | | | | | | |
| WX2_ | 0.050 | | | | | | | | |
| WX3_ | | 0.024 | | | | | | | |
| WX4_ | | 0.173 | 0.027 | | | | | | |
| WX5_ | | 0.103 | | | | | | | |
| WX6_ | 0.067 | 0.209 | | | | | | | |
| OTHER | 0.007 | 0.056 | 0.047 | | | | | | |

TABLE 5

| PHONE | 56 | TRLX | 7 NODES. | 13 ARCS. | 3 ARC LABELS. | | | | |
|---|---|---|---|---|---|---|---|---|---|
| NODE | 1 | 2 | 3 | 4 | 5 | 6 | 7 | | |
| LABEL | 320 | 321 | 322 | 323 | 324 | 325 | 0 | | |
| COUNT | 189.0 | 0.0 | 0.0 | 801.4 | 622.5 | 910.7 | 0.0 | | |
| ARC | 1 → 2 | 1 → 4 | 1 → 7 | 2 → 3 | 2 → 7 | 3 → 7 | 3 → 7 | 4 → 4 | 4 → 5 | 5 → 5 |
| LABEL | 160 | 160 | NULL | 161 | NULL | 162 | NULL | 160 | 161 | 161 |
| PROB | 0.00000 | 1.00000 | 0.00000 | 1.00000 | 0.00000 | 1.00000 | 0.00000 | 0.76216 | 0.23784 | 0.69493 |
| ARC | 5 → 6 | 6 → 6 | 6 → 7 | | | | | | | |
| LABEL | 161 | 162 | 162 | | | | | | | |
| PROB | 0.30507 | 0.79025 | 0.20975 | | | | | | | |
| LABEL | 160 | 161 | 162 | | | | | | | |
| COUNT | 801.4 | 811.4 | 910.8 | | | | | | | |
| BX1 | 0.339 | 0.134 | | | | | | | | |
| BX1T | 0.040 | | | | | | | | | |
| BX12 | 0.202 | 0.099 | | | | | | | | |
| BX2_ | 0.088 | | | | | | | | | |
| BX3_ | 0.065 | | | | | | | | | |
| BX4_ | | | 0.025 | | | | | | | |
| BX6_ | 0.037 | 0.604 | 0.046 | | | | | | | |
| BX9_ | | 0.023 | 0.069 | | | | | | | |
| DQ3_ | 0.012 | | | | | | | | | |
| TX2_ | | 0.022 | 0.070 | | | | | | | |
| TX5_ | | | 0.014 | | | | | | | |
| VX2_ | 0.056 | | | | | | | | | |
| VX4_ | 0.067 | | | | | | | | | |
| WX2_ | 0.060 | | | | | | | | | |
| XX1_ | | | 0.021 | | | | | | | |
| XX12 | | | 0.025 | | | | | | | |
| XX17 | | | 0.165 | | | | | | | |
| XX24 | | | 0.059 | | | | | | | |
| XX3_ | | 0.080 | 0.380 | | | | | | | |
| XX4_ | | | 0.020 | | | | | | | |
| XX6_ | | | 0.013 | | | | | | | |
| XX7_ | | | 0.018 | | | | | | | |

TABLE 5-continued

| OTHER | 0.034 | 0.039 | 0.075 |
|---|---|---|---|

TABLE 6

ONSETAA → <AA1,AI1,AU1,OU1,UH1,UU0,UU1,UX1>;
    α   $a^I$   $a^u$   o     u   u   U

ONSETAE → <AE1,EH0,EH1,EI1>;
    H   ε   ε   e

ONSETAW → <AW1,OI1>;
           I

ONSETBX → <BX,DX,GX>;
    b   d   g

ONSETDH → <DH,VX,HX>;
       v   h

ONSETTEE → <EE1>;
        i

ONSETER → <ER1,RX,ER0>;
      r

ONSETFX → <FX,TH>;
    f   θ

ONSETIX → <EE0,IX0,IX1,JX>;
    i   I   I   j

ONSETLX → <LX,WX,W@>;
    l   w   hw

ONSETMX → <MX,NX,NG>;
    m   n   y

ONSETH → <SH,ZH>;
   s   z

ONSETSX → <SX,ZX>;
   s   z

TABLE 6-continued

ONSETUH → <UH0>;
     ∂

TRAILAA → <AA1,AE1,EH1,IX0,IX1,UU0,UX1>;
    a   H   ε   I   I   u   U

TRAILAW → <UH0,UH1,EI1,AW1>;
    ∂         e

TRAILBX → <BX,CX,GX>;
    b   d   g

TRAILDH → <DH,VX,HX>;
      v   h

TRAILEE → <EE0,EE1,JX,IXG,EEG>;
    i   i   j   I   i

TRAILER → <ER0,ER1,RX>;
        r

TRAILFX → <FX,TH>;
    f   θ

TRAILKQ → <KQ,PQ,TQ>;
    h   h   h

TRAILLX → <LX,WX,OU1,UU1,UXG>;
    l   w   o   u   v

TRAILMX → <MX,NX,NG>;
    m   n   y

TRAILSH → <SH,ZH>;
   s   z

TRAILSX → <SX,ZX>;
   s   z

TABLE 7

| | | | |
|---|---|---|---|
| SP = '\|'; | SP = 'W@'; hw | SP = 'TRER'; | SP = 'AW1'; |
| SP = 'BX'; b | SP = 'XX'; | SP = 'TRFX'; | SP = 'EE1'; i |
| SP = 'DH'; | SP = 'ZH'; | SP = 'TRKQ'; | SP = 'EH1'; ε |
| SP = 'DX'; d | SP = 'ZX'; z | SP = 'TRLX'; | SP = 'EI1'; e |
| SP = 'D$'; | SP = '?X'; ? | SP = 'TRMX'; | SP = 'ER1'; |
| SP = 'FX'; f | SP = 'EEG'; i | SP = 'TRSH'; | SP = 'IX1'; I |
| SP = 'GX'; g | SP = 'IXG'; I | SP = 'TRSX'; | SP = 'OI1'; o |
| SP = 'HX'; h | SP = 'UXG'; | SP = 'AA0'; α | SP = 'OU1'; o |
| SP = 'JX'; j | SP = 'ONAA'; | SP = 'AE0'; | SP = 'UH1'; |
| SP = 'KQ'; h | SP = 'ONAE'; | SP = 'AI0'; $a^I$ | SP = 'UU1'; u |
| SP = 'KX'; k | SP = 'ONAW'; | SP = 'AU0'; $a^u$ | SP = 'UX1'; v |
| SP = 'LX'; l | SP = 'ONBX'; | SP = 'AW0'; | SP = 'AA2'; α |
| SP = 'MX'; m | SP = 'ONDH'; | SP = 'EE0'; i | SP = 'AE2'; |
| SP = 'NG'; η | SP = 'ONEE'; | SP = 'EH0'; ε | SP = 'AI2'; $a^I$ |
| SP = 'NX'; n | SP = 'ONER'; | SP = 'EI0'; e | SP = 'AU2'; $a^u$ |
| SP = 'NXV'; | SP = 'ONFX'; | SP = 'ER0'; | SP = 'AW2'; |
| SP = 'PQ'; h | SP = 'ONIX'; | SP = 'IX0'; I | SP = 'EE2'; i |
| SP = 'PX'; p | SP = 'ONLX'; | SP = 'OI0'; o   SP = 'EH2'; ε | |
| SP = 'RX'; r | SP = 'ONMX'; | SP = 'OU0'; o | SP = 'EI2'; e |
| SP = 'R$'; | SP = 'ONSH'; | SP = 'UH0'; | SP = 'ER2'; |
| SP = 'SH'; | SP = 'ONSX'; | SP = 'UU0'; u | SP = 'IX2'; I |
| SP = 'SX'; s | SP = 'ONUH'; | SP = 'UX0'; v | SP = 'OI2'; o |
| SP = 'TH'; θ | SP = 'TRAA'; | SP = 'AA1'; α | SP = 'OU2'; o |
| SP = 'TQ'; h | SP = 'TRAW'; | SP = 'AE1'; | SP = 'UH2'; |

TABLE 7-continued

| | | | |
|---|---|---|---|
| SP = 'TX'; t | SP = 'TRBX'; | SP = 'AI1'; $a^I$ | SP = 'UU2'; u |
| SP = 'VX'; v | SP = 'TRDH'; | SP = 'AU1'; $a^u$ | SP = 'UX2'; $v$ |
| SP = 'WX'; w | SP = 'TREE'; | | |

We claim:

1. In a speech recognition system having an acoustic processor which generates successive labels selected from an alphabet of labels in response to a spoken input wherein the labels are selected based on at least one predefined characteristic and wherein said predefined characteristic varies for at least one given sound depending on whether the sound is located adjacent to a period of silence or not, a method of forming baseforms for words comprising the steps of:

forming, for said one given sound, a plurality of different phone machines including a phone machine corresponding to said given sound being uttered adjacent to a period of silence and a phone machine corresponding to said given sound being uttered detached from silence, wherein each phone machine is characterizable as (i) a plurality of states, (ii) a plurality of transitions each of which extends from a state to a state, (iii) means for storing a probability for each transition, and (iv) means for storing label output probabilities, each label output probability corresponding to the probability of said each phone machine producing a particular label at an identified transition;

the probabilities for a given phone machine being determined from utterances of a sound corresponding thereto.

2. In a system having an acoustic processor which generates a string of acoustic labels from a fixed set alphabet of labels in response to a speech input based on acoustic energy characteristics, a method of forming a set of acoustic model phone machines which can be selectively arranged in sequences to represent word baseforms, the method comprising the steps of:

(a) classifying speech into a plurality of distinct phonetic sound classes;

(b) forming a set of Markov model phone machines wherein each model is characterized as having (i) a plurality of states, (ii) a plurality of transitions each of which extends from a state to a state, (iii) means for storing a probability for each transition and (iv) means for storing label output probabilities, each label output probability corresponding to the probability of said each phone machine producing a particular label at an identified transition;

(c) assigning to a given sound class an onset phone machine and a common phone machine in the set of phone machines, the onset phone machine being different from the common phone machine;

(d) generating, for storage in the onset phone machine assigned to the given sound class, transition probabilities and label output probabilities derived from at least one utterance of the sound corresponding to the given class when uttered at the beginning of a speech segment; and (e) generating, for storage in the common phone machine assigned to the given sound class, transition probabilities and label output probabilities derived from at least one utterance of the sound corresponding to the given class when uttered after the beginning of a segment;

(f) for each word starting with the given sound class, starting the word baseform therefor with the onset phone machine corresponding to the given sound class.

3. The method of claim 2 wherein the common phone machine of the given sound corresponds to a midword phone machine therefor, transition probabilities and label output probabilities derived from at least one utterance of the sound corresponding to the given class when uttered between the ends of a speech segment and wherein the method comprises the further step of:

(g) generating, for storage in a trailing phone machine assigned to the given sound class, transition probabilities and label output probabilities derived from at least one utterance of the sound corresponding to the given class when uttered at the end of a word;

(h) for each word ending with the given sound class, ending the word baseform therefor with the trailing phone machine corresponding to the given sound class; and providing the midword phone machine corresponding to the given sound class for insertion between the ends of any word baseform which corresponds to a word having the given sound class therein.

4. The method of claim 3 comprising the further steps of:

(j) repeating steps (b) through (h) for each of a plurality of sound classes.

5. The method of claim 4 wherein at least one onset phone machine is assigned to more than one sound class.

6. The method of claim 4 wherein at least one trailing phone machine is assigned to more than one sound class.

7. The method of claim 6 wherein each sound class corresponds to a phonetic element.

8. In a speech recognition system having an acoustic processor which generates a string of one acoustic label after another from a fixed set alphabet of labels for one time interval after another, a computerized method of constructing a set of Markov model phone machines used for recognizing words from an uttered speech input, the method comprising the steps of:

forming a set of phonetic phone machines, wherein each phonetic phone machine corresponds to a phonetic element from a fixed set of phonetic elements and wherein each phonetic phone machine has (i) a plurality of states, (ii) a plurality of arcs each of which extends from a state to a state, (iii) a computer-stored probability for each arc, and (iv) computer-stored label output probabilities, each label output probability corresponding to the probability of said each phone machine producing a corresponding acoustic label; and forming a set of transition phone machines, at least one transition phone machine representing an onset transition phone machine which corresponds to a speech transition resulting when at least one phonetic element is uttered after an interval of silence, wherein each transition phone machine has (i) a plurality of states, (ii) a plurality of arcs each of which extends from a state to a state, (iii) a computer-stored probability for each arc, and (iv) computer-stored label output probabilities, each label output probability corresponding to the probability of said each phone machine producing a corresponding acoustic label;

wherein each onset phone machine is associated with at least one phonetic element having a phonetic phone machine different from the onset phone machine.

9. The method of claim 8 wherein the forming of said set of transition phone machines includes forming a subset of trailing phone machines, the stored probabilities of each trailing phone machine being associated with at least one phonetic element when uttered at the end of an uttered segment of speech.

10. The method of claim 9 wherein a phonetic element can have no more than one onset phone associated therewith and no more than one trailing phone associated therewith and wherein the method comprises the further steps of:

constructing each word in a vocabulary as a word baseform corresponding to a respective concatenation of phone machines including the steps of:

where a word ends with a word-ending phonetic element which has an associated trailing phone machine, ending the corresponding word baseform with the phonetic phone machine corresponding to the word-ending phonetic element followed by the trailing phone machine associated with the onset phone machine, starting the corresponding word baseform with the phonetic phone machine corresponding to the word-starting phonetic element preceded by the onset phone machine associated with the word-starting phonetic element.

11. The method of claim 10 wherein at least one trailing phone machine corresponds to any one of a defined plurality of phonetic elements uttered at the end of a speech segment.

12. The method of claim 10 wherein at least one onset phone machine corresponds to any one of a defined plurality of phonetic elements uttered at the beginning of a speech segment.

13. The method of claim 12 wherein at least one trailing phone machine corresponds to any one of a defined plurality of phonetic elements uttered at the end of a speech segment.

14. A method of forming probabilistic models of words, said method comprising the steps of:

identifying a sequence of one or more phonemes forming a word, said sequence having a beginning and an end, each phoneme having a location in the sequence, said sequence having a transition location at the beginning, a transition location at the end, and at least one middle location between the beginning and ending transition locations, each phoneme belonging to a finite set of phonemes;

providing at least one probabilistic model of each phoneme;

replacing each phoneme in the sequence with a probabilistic model of the phoneme to form a sequence of phoneme probabilistic models in the same sequence as the phonemes forming the word; and concatenating the sequence of phoneme probabilistic models to form a probabilistic model of the word;

characterized in that for at least a first phoneme, the step of replacing the first phoneme comprises the steps of:

determining the locations of the first phoneme in the sequence;

replacing the first phoneme with a transition probabilistic model of the phoneme at a transition location if the first phoneme is at a transition location; and replacing the first phoneme with a common probabilistic model of the phoneme at a middle location if the first phoneme is at a middle location, said common probabilistic model being different from the transition probabilistic model of the first phoneme.

15. A method as claimed in claim 14, characterized in that the step of replacing the first phoneme with a transition probabilistic model further comprises the steps of:

replacing the first phoneme with an onset probabilistic model of the phoneme at a beginning location if the first phoneme is at a beginning location, said onset probabilistic model being different from the common probabilistic model; and replacing the first phoneme with a trailing probabilistic model of the phoneme at an ending location if the first phoneme is at an ending location, said trailing probabilistic model being different from the onset probabilistic model of the first phoneme and being different from the common probabilistic model of the first phoneme.

16. A method as claimed in claim 15, characterized in that the step of replacing the first phoneme further comprises the step of replacing the first phoneme with a hybrid onset/trailing probabilistic model of the phoneme if the first phoneme is the only phoneme in the sequence, said hybrid probabilistic model being different from the onset probabilistic model of the first phoneme, being different from the common probabilistic model of the first phoneme, and being different from the trailing probabilistic model of the first phoneme.

17. A method as claimed in claim 16, characterized in that:

each probabilistic model is a Markov model, each Markov model having a plurality of states, a plurality of transitions extending from one state to the same or another state, a stored probability for each transition, and stored label output probabilities representing the probabilities that the utterance of the phoneme will produce one or more labels; and each different phoneme in the set of phonemes is a different sound.

18. A method as claimed in claim 15, characterized in that:

the onset probabilistic model of the first phoneme comprises the common probabilistic model of the first phoneme concatenated onto the end of a first prefix probabilistic model;

the trailing probabilistic model of the first phoneme comprises a first suffix probabilistic model concatenated onto the end of the common probabilistic model of the first phoneme.

19. A method as claimed in claim 18, characterized in that:

a second phoneme has an onset probabilistic model, a common probabilistic model, and a trailing model;

the onset probabilistic model of the second phoneme concatenated onto the end of the first prefix probabilistic model;

the trailing probabilistic model of the second phoneme comprises the first suffix probabilistic model concatenated onto the end of the common probabilistic model of the second phoneme.

* * * * *